US009398427B2

(12) United States Patent
Arur et al.

(10) Patent No.: US 9,398,427 B2
(45) Date of Patent: Jul. 19, 2016

(54) SYSTEM AND METHOD FOR EFFICIENT USE OF RADIO RESOURCES FOR PUSH-TO-TALK SERVICES IN MOBILE WIRELESS COMMUNICATIONS SYSTEMS

(71) Applicant: Hughes Network Systems, LLC, Germantown, MD (US)

(72) Inventors: Deepak Arur, Mclean, VA (US); Channasandra Ravishankar, Germantown, MD (US); Nassir Benammar, Rockville, MD (US); Gaguk Zakaria, College Park, MD (US); Steve Mirra, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 13/902,513

(22) Filed: May 24, 2013

(65) Prior Publication Data

US 2013/0315164 A1    Nov. 28, 2013

Related U.S. Application Data

(60) Provisional application No. 61/651,547, filed on May 24, 2012.

(51) Int. Cl.
*H04W 4/10* (2009.01)
*H04W 76/00* (2009.01)

(52) U.S. Cl.
CPC .............. *H04W 4/10* (2013.01); *H04W 76/002* (2013.01)

(58) Field of Classification Search
None
See application file for complete search history.

(56) References Cited

U.S. PATENT DOCUMENTS

| 2005/0122923 | A1 | 6/2005 | Jang et al. |
| 2005/0245203 | A1 | 11/2005 | Vance |
| 2006/0003784 | A1 | 1/2006 | Chion et al. |
| 2006/0045071 | A1 | 3/2006 | Vimpari et al. |
| 2006/0229093 | A1 | 10/2006 | Bhutiani et al. |
| 2007/0049314 | A1* | 3/2007 | Balachandran et al. ...... 455/518 |

(Continued)

FOREIGN PATENT DOCUMENTS

EP    1655977 A1    5/2006

OTHER PUBLICATIONS

PCT/US2013/042740 International Search Report and Written Opinion, dated Aug. 9, 2013.

*Primary Examiner* — Faruk Hamza
*Assistant Examiner* — Cassandra Decker
(74) *Attorney, Agent, or Firm* — Potomac Technology Law, LLC

(57) ABSTRACT

A resource efficient approach for push-to-talk (PTT) services over a mobile communications network is provided. A remote terminal (UT) receives a command for initiating a PTT session. The UT generates a RAB binding create message, including a PTT session identifier and RAB binding information, and transmits the RAB binding create message to a wireless gateway. The UT receives a RAB binding response from the wireless gateway, and performs a protocol signaling process for establishing PDP bearers, and for establishing the PTT session on a PTT server. The UT receives a command for initiation of media transmission for the PTT session, generates talk burst (TB) request message, and transmits the request message to the wireless gateway (the TB request message is transmitted via media access control (MAC) layer control messaging). In response, the UT receives a talk burst grant message from the wireless gateway.

32 Claims, 21 Drawing Sheets

(56) References Cited

U.S. PATENT DOCUMENTS

| | | | |
|---|---|---|---|
| 2008/0032699 A1* | 2/2008 | Jang | H04W 76/005 455/452.1 |
| 2008/0096597 A1 | 4/2008 | Vempati et al. | |
| 2009/0180463 A1* | 7/2009 | Yang et al. | 370/349 |
| 2010/0009709 A1 | 1/2010 | Shiga | |
| 2010/0220604 A1* | 9/2010 | Skog et al. | 370/252 |
| 2011/0134757 A1 | 6/2011 | Lin et al. | |

* cited by examiner

SYSTEM AND METHOD FOR EFFICIENT USE OF RADIO RESOURCES FOR PUSH-TO-TALK SERVICES IN MOBILE WIRELESS COMMUNICATIONS SYSTEMS

RELATED APPLICATIONS

This application claims the benefit of the earlier filing date under 35 U.S.C. §119(e) of U.S. Provisional Application Ser. No. 61/651,547 (filed 24 May 2012), the entirety of which is incorporated herein by reference.

BACKGROUND

Terrestrial communications systems continue to provide higher and higher speed multimedia (e.g., voice, data, video, images, etc.) services to end-users. Such services (e.g., Third Generation (3G) and Fourth Generation (4G) services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems (MSS) are being designed to complement and/or coexist with terrestrial coverage depending on spectrum sharing rules and operator choice. With the advances in processing power of desktop computers, the average user has grown accustomed to sophisticated applications (e.g., streaming video, radio broadcasts, video games, etc.), which place tremendous strain on network resources. Internet services, as well as other IP services, rely on protocols and networking architectures that offer great flexibility and robustness; however, such infrastructure may be inefficient in transporting IP traffic, which can result in large user response time, particularly if the traffic has to traverse an intermediary network with a relatively large latency (e.g., a satellite network). To promote greater adoption of data communications services, the telecommunications industry, from manufacturers to service providers, has agreed at great expense and effort to develop standards for communications protocols that underlie the various services and features.

Satellite systems, however, pose unique design challenges over terrestrial systems. That is, mobile satellite systems have different attributes that make terrestrial designs either not applicable or inefficient for satellite systems. For example, satellite systems are characterized by long delays (as long as 260 ms one-way) between a user terminal device and a base station compared to the relatively shorter delays (e.g., millisecond or less) in terrestrial cellular systems—which implies that protocols on the satellite links have to be enhanced to minimize impact of long propagation delays. Additionally, satellite links typically have smaller link margins than terrestrial links for a given user-terminal power amplifier and antenna characteristics; this implies that higher spectral efficiency and power efficiency are needed in satellite links. Moreover, the satellite transmission or channel resources represent limited resources, where the deployment of additional transmission resources is significantly more expensive, difficult and time consuming as compared with terrestrial radio resources. Accordingly, the transmission resources of a satellite system must be used efficiently to maximize the available bandwidth, in order to provide the required quality of service for the extensive and diverse assortment of service applications available to the mobile user, and to maximize the number of potential users in a system without adversely affecting the quality of service.

An IP Multicast service is a point to multipoint service, where hosts or users join an IP multicast session by using host-router protocols, such as Internet Group Management Protocol (IGMP). Traditional wireless IP networks are typically deployed based on unicast architectures and protocols. Accordingly, under a unicast framework or infrastructure, for a multicast session, each IP packet of the multicast session must be transmitted individually to each participating host via a wireless link (e.g., in a unicast or point to point manner). Such a multicast session, therefore, would utilize as many radio resources as there are hosts participating in the multicast session, which inefficiently consumes extensive radio resources for a multicast session.

Push-to-talk (PTT) services provide a method of conversing on half-duplex communication lines (including two-way radio), using a momentary button to switch from reception mode (listen mode) to transmit mode (talk mode). PTT over Cellular (PoC) provides PTT services over cellular phone networks, enabling use of a mobile phone as a two-way PTT radio (e.g., a walkie-talkie) over unlimited range (only limited by the mobile network coverage). One significant advantage of PoC/PTT services is that a single person is able to an active talk group with a single button press, without having to make several calls to coordinate with a group. The Open Mobile Alliance (OMA) PoC specifications define standardized architectures and protocols to implement a half-duplex push-to-talk service over an IP based infrastructure using voice over IP (VoIP) and using Session Initiation Protocol (SIP) for call signaling. A 3GPP packet-switched wireless network can provide the IP infrastructure over which the PoC service can be implemented.

A key feature of the 3GPP network is its ability to provide differentiated QoS for the different simultaneous packet flows using the network, which are carried on different Packet Data Protocol (PDP) bearers. In the context of a PoC service, this means that the SIP-based call signaling flow, the PoC floor control flow and the VoIP media flow each can receive the QoS best suited to it. 3GPP specifications recommend that SIP-based call signaling and PoC floor control flows should receive interactive class QoS, whereas the voice media flow should receive streaming class QoS.

Being a half-duplex service, PoC has the potential to be operated resource-efficiently because the floor control protocol guarantees that no more than one participant is allowed to speak at a time, and therefore that only one participant need be given uplink resources at any time. Similarly, all the participants receive the talker's media stream and therefore there is the potential (assuming that a common voice codec is used by all participants) to transmit this media once and have many or all participants in the same cell receive the same transmission, conserving downlink resources. Realizing these resource efficiencies for PoC in a practical 3GPP packet switched network is challenging for a number of reasons. First, QoS is decided when a PDP bearer is set up, and modifying the QoS or releasing the bearer and establishing another one requires PDP context signaling that utilizes significant radio and spectral resources. Further, when the wireless links are slow and have long propagation delays, this signaling can introduce latencies of several seconds, which would be unacceptably large if incurred each time the floor was handed over in a PoC session. Second, each PDP bearer has an associated radio bearer, which in turn is allocated its own radio resources. Accordingly, with standard 3GPP radio bearers, the PDP bearers of multiple PoC session participants cannot use the same downlink radio resource to receive a common media stream, and thus efficiencies cannot be achieved by delivering such common media streams over a single radio resource.

Currently, some mobile satellite systems (MSS) support PoC services, however, they do so using proprietary architectures and methods, and thus are not based on the OMA PoC specifications.

Example embodiments of the present invention provide system architectures and methods to solve these problems and realize resource efficiencies in PoC services over mobile wireless terrestrial and satellite communications systems as described below.

SOME EXAMPLE EMBODIMENTS

The present invention advantageously addresses the foregoing requirements and needs, as well as others, by providing system architectures and methods for the provision of resource efficient push-to-talk (PTT) over cellular (PoC) services in mobile wireless and wireline terrestrial and satellite communications systems.

In accordance with an example embodiment, an approach comprises a remote wireless terminal that receives a command for initiation of media transmission for a push-to-talk (PTT) session over a mobile communications network. The remote wireless terminal generates a UT talk burst request message, and transmits the UT talk burst request message to a wireless gateway of the mobile communications network, wherein the UT talk burst request message is transmitted via media access control (MAC) layer control messaging. In response to the UT talk burst request message, the terminal receives a talk burst grant message from the wireless gateway. According to a further example, the remote wireless terminal, in further response to the UT talk burst request message, receives an uplink channel resource allocation message, pre-assigning guaranteed uplink data resources for transmission of PTT session media data, which may be received via the MAC layer control messaging. According to a further example, the remote wireless terminal receives a command for termination of the media transmission for the PTT session. The terminal generates a UT talk burst release message, and transmits the UT talk burst release message to the wireless gateway, wherein the UT talk burst release message is transmitted via the MAC layer control messaging over the wireless channel. In response to the UT talk burst release message, the terminal receives a talk burst revoke message from the wireless gateway.

In accordance with a further example embodiment, prior to the receipt of the command for initiation of media transmission for the PTT session, the remote wireless terminal receives a user command for initiation of the PTT session, including a PTT session identifier. The terminal generates a radio access bearer (RAB) binding create message, including the PTT session identifier and RAB binding information that provides information for associating the PTT session with respective radio access bearers (RABs), and transmits the RAB binding create message to the wireless gateway. In response to the RAB binding create message, the terminal receives a RAB binding response message from the wireless gateway. The terminal performs a protocol signaling process for establishing one or more packet data protocol (PDP) bearers over a core network of the communications network, and for establishment of the PTT session on a PTT application server. By way of example, the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

In accordance with a further example embodiment, prior to the receipt of the command for initiation of media transmission for the PTT session, the remote wireless terminal receives a session invite message from a PTT application server for the PTT session, including a PTT session identifier. The terminal generates a radio access bearer (RAB) binding create message, including the PTT session identifier and RAB binding information that provides information for associating the PTT session with respective radio access bearers (RABs), and transmits the RAB binding create message to the wireless gateway. In response to the RAB binding create message, the terminal receives a RAB binding response message from the wireless gateway. The terminal performs a protocol signaling process for establishing one or more packet data protocol (PDP) bearers over a core network of the communications network, and for establishment of the PTT session on the PTT application server.

In accordance with a further example embodiment, prior to the receipt by the remote wireless terminal of the command for initiation of media transmission for the PTT session, the remote wireless terminal receives a user command for initiation of a PTT client. The terminal generates a radio access bearer (RAB) binding create message, including RAB binding information that provides information for associating the PTT session with respective radio access bearers (RABs), and transmits the RAB binding create message to the wireless gateway. In response to the RAB binding create message, the terminal receives a first RAB binding response message from the wireless gateway. The terminal performs a protocol signaling process for establishing one or more packet data protocol (PDP) bearers over a core network of the communications network, and for establishment of a pre-established session on a PTT application server. The remote wireless terminal receives a user command for initiation of the PTT session, generates a RAB binding update message, including a PTT session identifier, and transmits the RAB binding update message to the wireless gateway. In response to the RAB binding update message, the terminal receives a second RAB binding response message from the wireless gateway, and performs a protocol signaling process for associating the PTT session with the pre-established session based on the PTT session identifier. According to a further example, the remote wireless terminal, in further response to the RAB binding update message, receives a downlink channel resource allocation message, pre-assigning guaranteed downlink data resources for receipt of PTT session media data, wherein the downlink channel resource allocation message may be received via the MAC layer control messaging.

In accordance with a further example embodiment, prior to the receipt by the remote wireless terminal of the command for initiation of media transmission for the PTT session, the remote wireless terminal receives a user command for initiation of a PTT client. The terminal generates a radio access bearer (RAB) binding create message, including RAB binding information that provides information for associating the PTT session with respective radio access bearers (RABs), and transmits the RAB binding create message to the wireless gateway. In response to the RAB binding create message, the terminal receives a first RAB binding response message from the wireless gateway. The terminal performs a protocol signaling process for establishing one or more packet data protocol (PDP) bearers over a core network of the communications network, and for establishment of a pre-established session on a PTT application server. The remote wireless terminal receives a talk burst control connect message from the PTT application server, including a PTT session identifier, generates a RAB binding update message, including the PTT session identifier, and transmits the RAB binding update message to the wireless gateway. In response to the RAB binding update message, the terminal receives a second RAB binding response message from the wireless gateway. According to a further example, the remote wireless terminal, in further response to the RAB binding update message, receives a downlink channel resource allocation message, pre-assigning guaranteed downlink data resources for receipt of PTT session media data, wherein the downlink channel resource allocation message may be received via the MAC layer control messaging.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings, and in which like reference numerals refer to similar elements, and wherein.

DETAILED DESCRIPTION

System architectures and methods for the provision of resource efficient push-to-talk (PTT) over cellular (PoC) services in mobile wireless and wireline terrestrial and satellite communications systems, are provided. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments are discussed with respect to an Internet Protocol (IP)-based architecture, it is recognized by one of ordinary skill in the art that these embodiments have applicability to any type of packet based communications system and equivalent functional capabilities.

Figure 1:
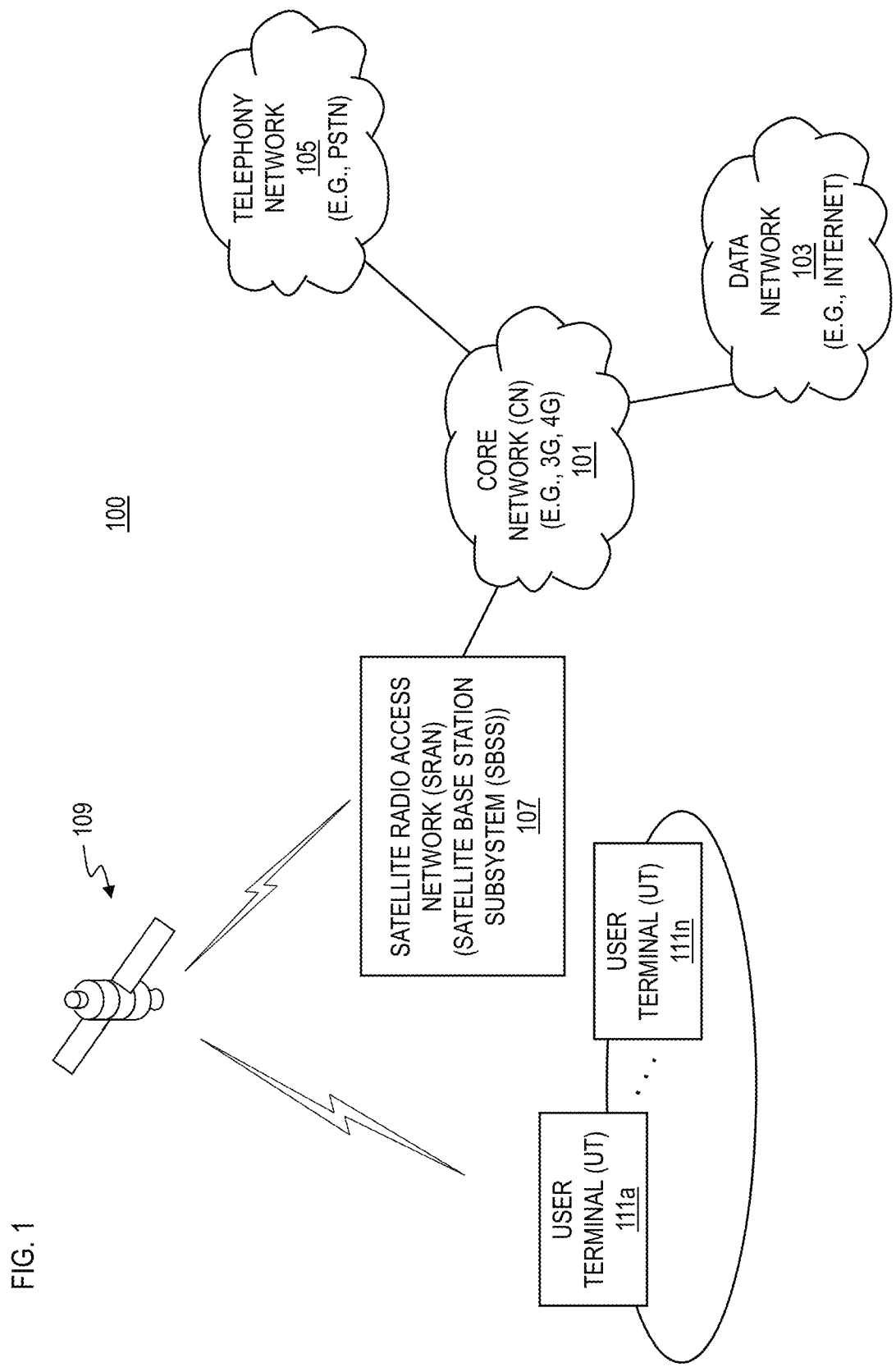
FIGS. 1 and 2 illustrate diagrams of communications systems capable of providing Internet Protocol (IP) based communications sessions among terrestrial (wireline and wireless) and satellite domains, according to various example embodiments.
Figure 2:
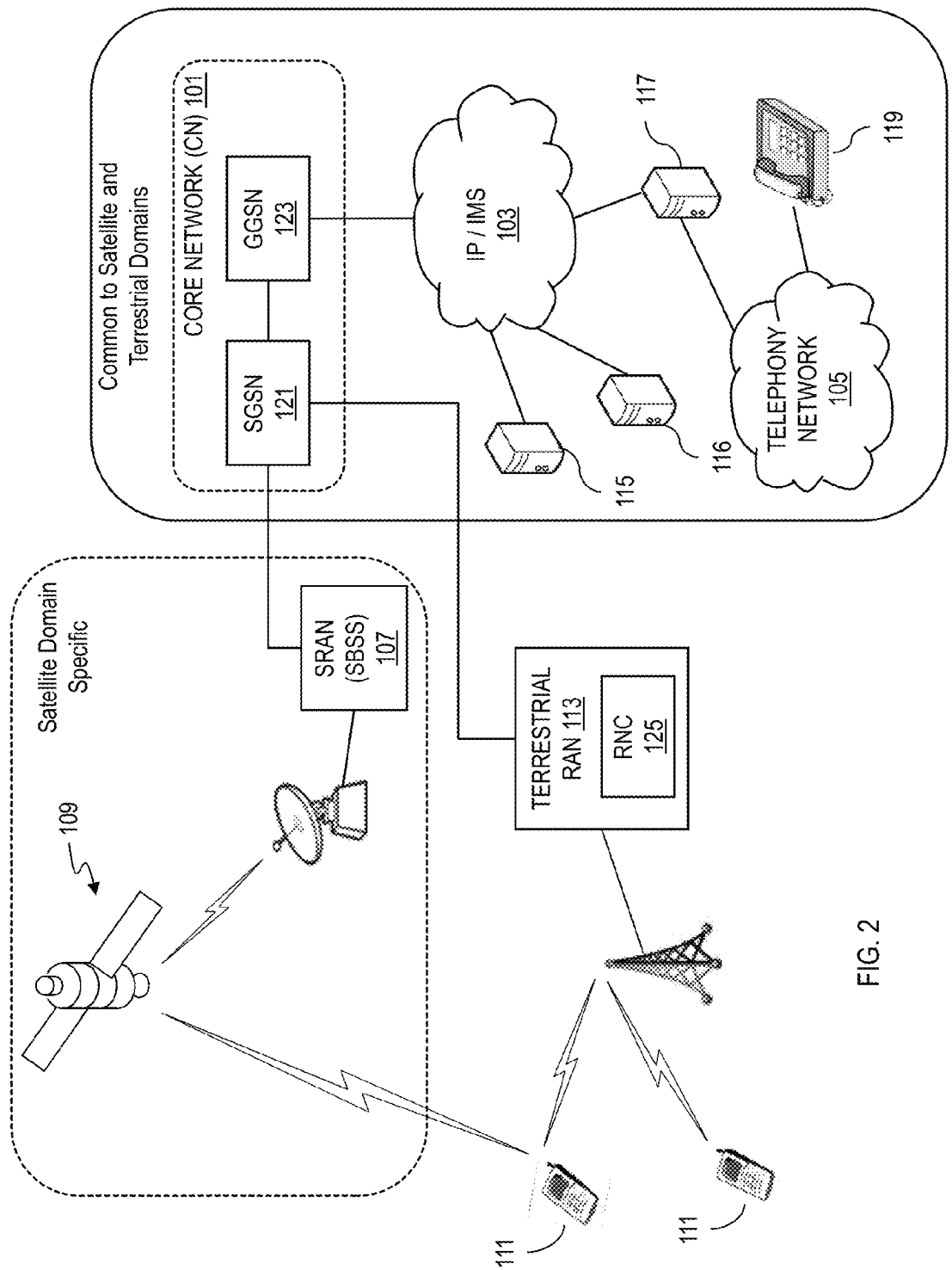

FIGS. 1 and 2 illustrate diagrams of communications systems capable of providing Internet Protocol (IP)-based communications sessions from a terrestrial (wireline or wireless) domain to a satellite domain, according to various example embodiments. For the purposes of illustration, a system 100 of FIG. 1 supports multimedia services using an Internet Protocol (IP) architecture, such that end-to-end communications sessions are packetized. By way of example, a terrestrial core network (CN) 101 is a wireless core network that is compliant with a Third Generation (3G) or Fourth Generation (4G) architecture; e.g., Third Generation Partnership Project (3GPP)-based. For example, the system 100 can utilize a satellite air interface denoted as GMR-1 3G, which is an evolution of the GMR-1 air interface standards; GMR-1 3G has been adopted as a mobile satellite system standard by the European Telecommunications Standards Institute (ETSI) and the International Telecommunications Union (ITU). The wireless core network 101 may also have connectivity to a data network 103 and a telephony network 105.

Networks 101, 103, and 105 may be any suitable wireline and/or wireless network. For example, telephony network 105 may include a circuit-switched network, such as the public switched telephone network (PSTN), an integrated services digital network (ISDN), a private branch exchange (PBX), an automotive telematics network, or other like network. Wireless network 101 (e.g., cellular system) may employ various technologies including, for example, code division multiple access (CDMA), enhanced data rates for global evolution (EDGE), general packet radio service (GPRS), global system for mobile communications (GSM), IP multimedia subsystem (IMS), universal mobile telecommunications system (UMTS), etc., as well as any other suitable wireless medium, e.g., microwave access (WiMAX), wireless fidelity (WiFi), satellite, and the like. Moreover, data network 103 may be any local area network (LAN), metropolitan area network (MAN), wide area network (WAN), the Internet, or any other suitable packet-switched network, such as a commercially owned, proprietary packet-switched network having voice over Internet Protocol (VoIP) capabilities, e.g., a proprietary cable or fiber-optic network.

Within the satellite domain, a satellite radio access network (SRAN) (also referred to as a satellite base station subsystem (SBSS)) 107 is introduced that implements the necessary modifications and enhancements for efficient operation over a satellite 109 to one or more user terminals 111a-111n. These terminals 111a-111n can be of various types with different form factors and transmit capabilities; e.g., sleek hand-held terminals, personal digital assistants (PDAs), vehicular terminals, portable terminals, fixed terminals, automotive telematics terminals, etc.

The SRAN 107 communicates with the wireless network 101, which includes a core network (e.g., 3G/4G) that is unchanged from terrestrial core network. This consequently permits operators to reuse existing 3G/4G core network elements. The interface between the SRAN 107 and the 3G/4G core network 101 can be a standard terrestrial interface. Again, a 3G network interfaces with the 3G/4G CN 101 to transmit IP packets to external networks such as the internet. The CN 101 includes a Serving GPRS Support Node (SGSN) 121 and a Gateway GPRS Support Node (GGSN) 123. The SGSN 121 is generally operable to transfer data packets to and from UT 111 within its geographical area. Some of the non-limiting functions of SGSN 121 include packet routing and transfer, authentication and charging functions of GPRS mobiles, mobility management and logical link management. A location register of the SGSN 121 stores location information (for example, current cell, current Visitor Location Register) and user profiles of all GPRS users registered with the SGSN 121. The GGSN 123 is responsible for sending user packets to external IP based networks and routing packets back to the mobile user. GGSN 123 is operable to convert GPRS packets coming from SGSN 121 into the appropriate Packet Data Protocol (PDP) format and sends them out to corresponding packet data network. GGSN 123 has several functions, including packet inspection for detecting different types for traffic, which can be used for shaping the traffic under different network load conditions. GGSN 123 keeps a record of active mobile users attached to SGSN 121. GGSN 122 is also responsible for policy control, billing and assigning IP addresses to mobile users. When GGSN 123 receives data addressed to a specific user routed through the CN 101, it checks if the user is active. For example, if UT 111 is active, GGSN 123 forwards the data to SGSN 121, and if UT 111 is not active, the data are discarded.

It is also noted that the architecture of the system 100 permits the same core network element to simultaneously communicate with a terrestrial base station (not shown) and the SRAN 107. This capability is illustrated in FIG. 2. As seen, the system 100 enables handover procedures between terrestrial base-station and the SRAN 107 to be executed via a core network 101 with standard procedures defined in terrestrial systems. In this example, the UT 111 has the capability to communicate over a satellite link or directly communicate with a terrestrial radio access network (RAN) 113 to the wireless core network (CN) 101. The RAN 113 comprises a radio network controller (RNC) 125, which is responsible for the radio resource management functions and certain mobility management functions of the network. By way of example, the data network 103 is configured as an IP/IMS (IP Multimedia Subsystem) with multiple application servers 115, 116 supplying multimedia services (e.g., server 115 may be a PoC server, and server 116 may be a multicast content server). Further, the data network 103 couples to the PSTN 105 via a media gateway 117; the PSTN 105 can serve one or more voice terminals 119.

In the system 100, a radio access bearer (RAB) is associated with Packet Data Protocol (PDP) context maintained between the user terminal (UT) 111 and the core network (CN) 101. For instance, one RAB can be established for Session Initiation Protocol (SIP) call signaling, and be maintained as long as the user wishes to make and receive calls. Another RAB is established on demand for the transport of the voice media while a call is in session. The satellite radio access network establishes and maintains Radio Bearers (RBs) between the UT 111 and the SRAN 107 necessary to satisfy, for example, Quality of Service (QoS) requirements of the SIP call signaling and Voice over IP (VoIP) user plane RABs. The signaling radio bearer supports signaling connectivity between the UT 111 and the satellite radio access network.

SIP protocol is typically used for establishing the initiation, and the management, of a session. A SIP message mainly contains three sections detailing the session, timing and media descriptions. A Packet Data Protocol (PDP) context is created for each session initiated, which contains the desired characteristics of the specific session, including the PDP type and the demanded QoS among other parameters. A PDP context can be viewed as a set of information maintained by UT, GGSN and SGSN. It contains a PDP type that identifies the type of Packet Data Network (PDN), the PDP address, QoS information and other session information. Activating a PDP context refers to creating the PDP context at the UT, SGSN and GGSN so that UT can communicate with an entity in PDN using the PDP address maintained in the PDP context.

Further, a secondary PDP context activation allows the subscriber to establish a PDP context with a different QoS profile to the same PDN.

While specific reference will be made thereto, it is contemplated that system 100 may embody many forms and include multiple and/or alternative components and facilities.

The Core Network (CN) 101 may include a Proxy-Call Session Control Function (P-CSCF), a Serving-Call Session Control Function (S-CSCF), an Interrogating-Call Session Control Function (I-CSCF), a Media Resource Function Controller (MRFC), a Media Resource Function Processor (MRFP), a Media Gateway (MGW), a Media Gateway Controller Function (MGCF) and a Signaling Gateway (SGW). Note that these components are the components that relate to Session Initiation Protocol (SIP). For other applications, however, the CN 101 may include different components. Additionally, all such components associated with SIP signaling are known in the art, and thus are not shown in the Figures and their functionality is not discussed in detail herein.

As introduced above, push-to-talk (PTT) over cellular services (referred to simply as PoC services) provide a method of conversing on half-duplex communication lines over cellular phone networks, enabling use of a mobile phone as a two-way PTT radio over unlimited range (only limited by the mobile network coverage). The Open Mobile Alliance (OMA) PoC specifications define the architecture and protocols to implement a half-duplex push-to-talk service over an IP based infrastructure using voice over IP (VoIP) and using Session Initiation Protocol (SIP) for call signaling. As an IP network, a 3GPP packet-switched wireless network (either cellular or satellite) can provide the IP infrastructure over which the PoC service can be implemented. A key feature of the 3GPP network is its ability to provide differentiated QoS for the different simultaneous packet flows using the network, which are carried on different Packet Data Protocol (PDP) bearers. In the context of a PoC service, this means that the SIP-based call signaling flow, the PoC floor control flow and the VoIP media flow each can receive the QoS best suited to it. 3GPP specifications recommend that SIP-based call signaling and PoC floor control flows should receive interactive class QoS, whereas the voice media flow should receive streaming class QoS. The 3GPP specifications describe two options to map the PoC service onto PDP bearers: (1) PoC media can share the same bearer as IMS signaling (recommended to be an interactive class Secondary PDP Context (SPDPC)); or (2) a separate SPDPC with appropriate QoS (recommended to be streaming class) can be used for media, the media bearer being set up (or released) when the UT obtains (or loses) the talk floor.

Packet Data Protocol (PDP) Bearers:

According to example embodiments, two approaches are provided for mapping the PoC service flows to SPDPCs, one approach for unicast PoC session participants, and another approach for multicast PoC session participants. These approaches facilitate the implementation of unique resource optimization techniques for each bearer in a way that best matches the requirements of the respective traffic over that bearer. Further, the approaches of the example embodiments are compatible with both of the Bearer Control Modes specified in the 3GPP specifications, that is, with terminal-initiated as well as with network-initiated PDP context activation.

Figure 3A:
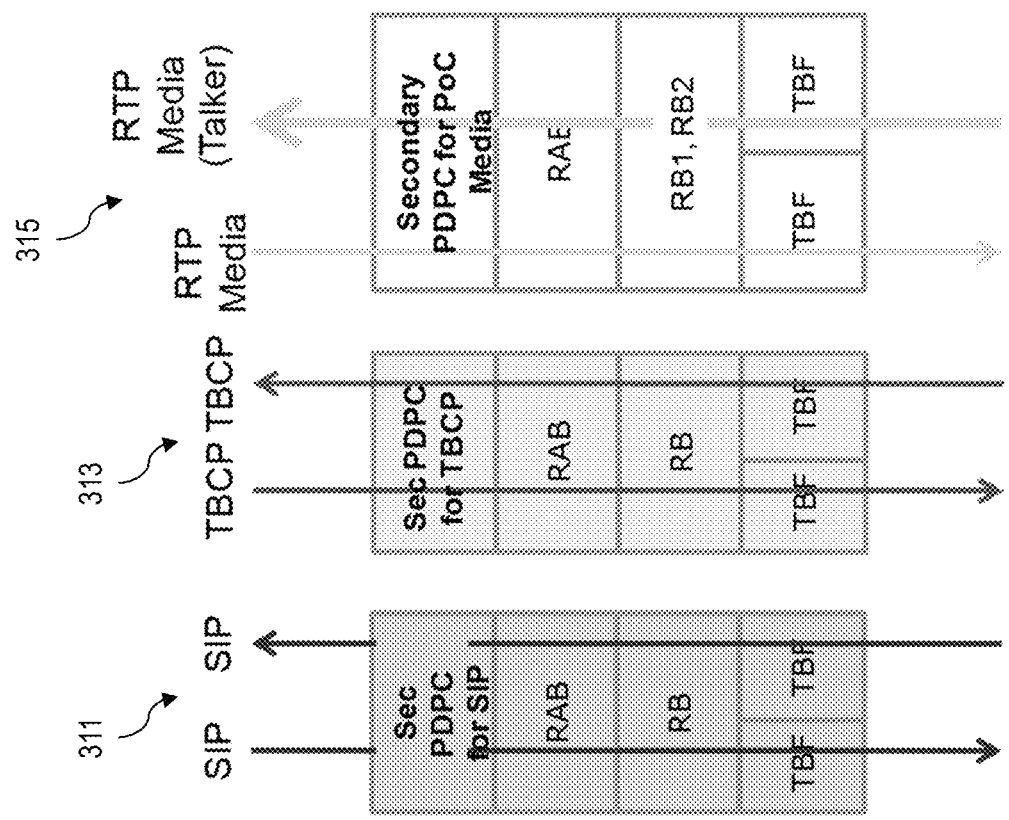
FIG. 3A illustrates the Secondary PDP Context (SPDPC) bearers utilized for unicast PoC services, in accordance with example embodiments.
Figure 3B:
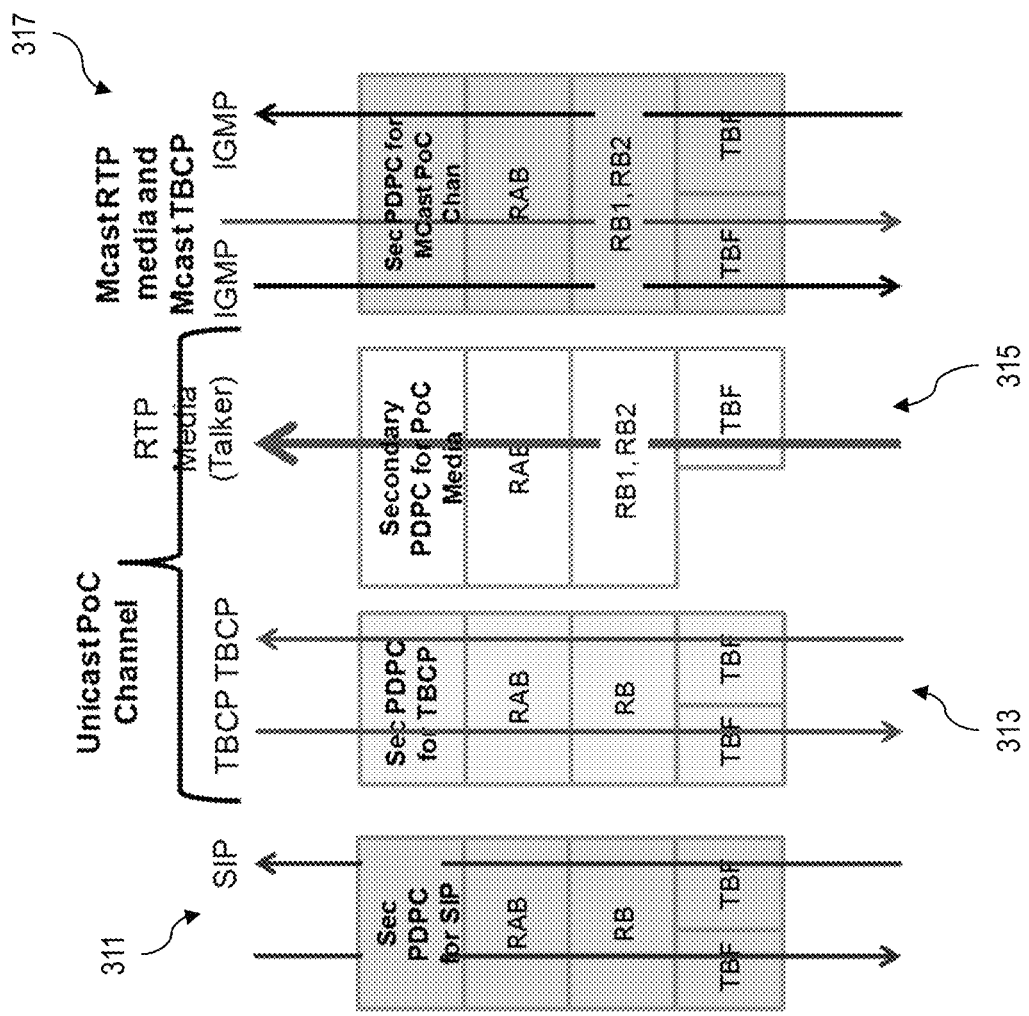
FIG. 3B illustrates the Secondary PDP Context (SPDPC) bearers utilized for multicast PoC services, in accordance with example embodiments.

FIG. 3A illustrates the secondary PDP context (SPDPC) bearers utilized for unicast PoC services, in accordance with example embodiments. One bearer utilized for such unicast PoC services consists of the SIP bearer 311, which comprises an interactive class SPDPC bearer for carrying the SIP control plane signaling associated with the PoC session. A second bearer consists of the unicast talk burst control protocol (TBCP) bearer 313, which comprises an interactive class SPDPC bearer for carrying talk burst control user plane signaling associated with the session. Lastly, a third bearer consists of the unicast media bearer 315, which comprises a conversational or streaming class SPDPC bearer for carrying downlink and uplink PoC unicast VoIP media flows. The resource allocation for the unicast media bearer is performed in accordance with the system architectures and protocols of the example embodiments, as described herein. Further, FIG. 3B illustrates the secondary PDP context (SPDPC) bearers utilized for multicast PoC services, in accordance with example embodiments. A multicast PoC service is a point to multipoint service, where the terminal hosts participating in the multicast PoC session monitor a common content stream transmitted by, for example, a PoC server. The bearers utilized for such multicast PoC services consist of the same bearers as for the unicast PoC services, with one additional bearer. The additional bearer for multicast PoC services consists of the multicast media bearer 317, which comprises a conversational or streaming class SPDPC bearer for carrying multicast PoC VoIP media and multicast talk burst control user plane signaling in the downlink direction, and IGMP multicast signaling from the host or user terminal (UT) in the uplink direction.

Radio Access Bearer (RAB) Binding:

In accordance with example embodiments, special optimizations are performed by the SRAN 107 with respect to PoC bearers. In order to perform these special optimizations, the SRAN needs to be able to identify the bearers and associate them with the respective PoC session(s). By way of example, based on a radio resource control (RRC) process, the UT assists the SRAN by providing such required information regarding the bearers, known as the RAB Binding information. This RRC process is applicable to both on-demand PoC session initiation procedures and with pre-established PoC sessions, and with unicast PoC services as well as with multicast PoC services. The RAB binding information may include identifiers of the RABs, identification of type(s) of the application(s) that will use the RABs (e.g. PoC, IP Multicast, etc.), and application-specific information, such as, the PoC session signaling mode (e.g. on-demand or pre-established), the PoC channels (unicast or multicast) and PoC group or session identification information (if known). FIGS. 4A-4D illustrate radio access bearer (RAB) binding processes for various PoC session modes, in accordance with example embodiments. For these processes, the establishment of the PDP bearers can be performed, for example, based on standard protocols—such as described by the 3GPP publication TS 24.008 "Core Network Protocols", version 7.4.0. Similarly, the PoC session creation by the PoC server can be performed, for example, based on standard protocols—such as described by the Open Mobile Alliance publication "OMA PoC Control Plane," Approved Version 1.0.3 (22 Sep. 2009) (OMA-TS-PoC ControlPlane-V1.0.3-20090922-A).

Figure 4A:
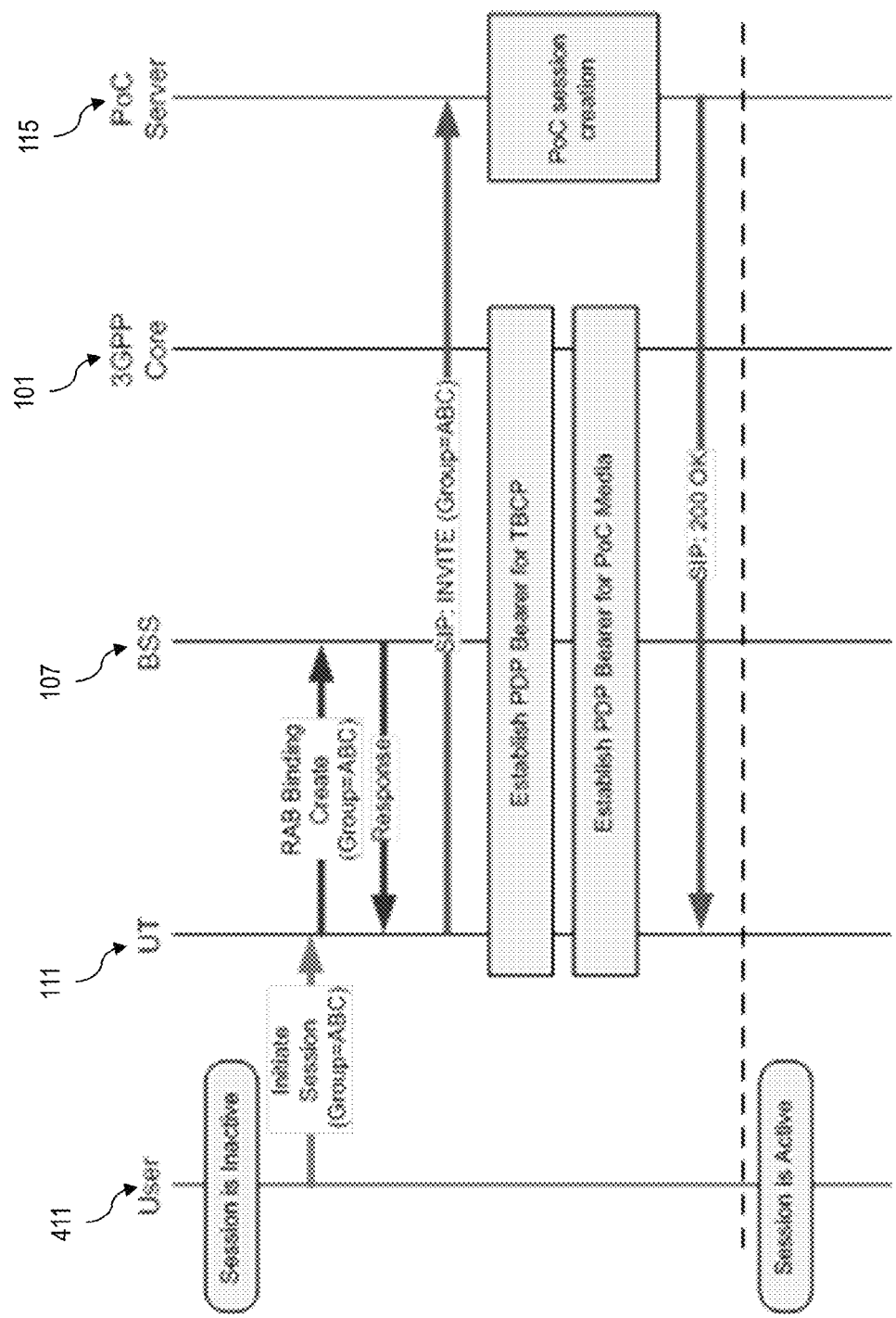
FIG. 4A illustrates a radio access bearer (RAB) binding process for a new PoC session, using on-demand signaling, initiated at a host terminal, in accordance with an example embodiment.

In accordance with an example embodiment, FIG. 4A illustrates a radio access bearer (RAB) binding process for a new PoC session using on-demand signaling, initiated at a host terminal. For example, with respect to an on-demand PoC session initiated by the User 411, the User initiates the PoC session for a particular group (identified within the UT by a common group identifier (GID)). Prior to initiating the session, the UT 111 sends the RAB binding information to the SRAN 107, identifying the PDP bearers and the RABs that will be used for the PoC talk burst control and voice media. This information enables the SRAN 107 to activate the necessary optimizations with respect to the identified bearers. Along with the RAB binding information, the UT 111 also includes the common GID for the PoC group or session, so that the SRAN 107 can place or move other session participants, (e.g., located in the same cell as the UT 111), on to the same traffic carrier. The SRAN 107 sends a RAB binding response or acknowledgement message back to the UT 111. Once the UT 111 receives the response, the UT sends a SIP invite over the SIP bearer to the PoC server 115. The UT 111 and the Core Network (CN) 101 set up the PDP bearers for the TBCP and for the PoC media (which will be used for the PoC session), and the PoC server 115 creates the session. The PoC server 115 completes the process by sending a SIP OK response message (acknowledging the SIP invite) over the SIP bearer back to the UT 111.

Figure 4B:
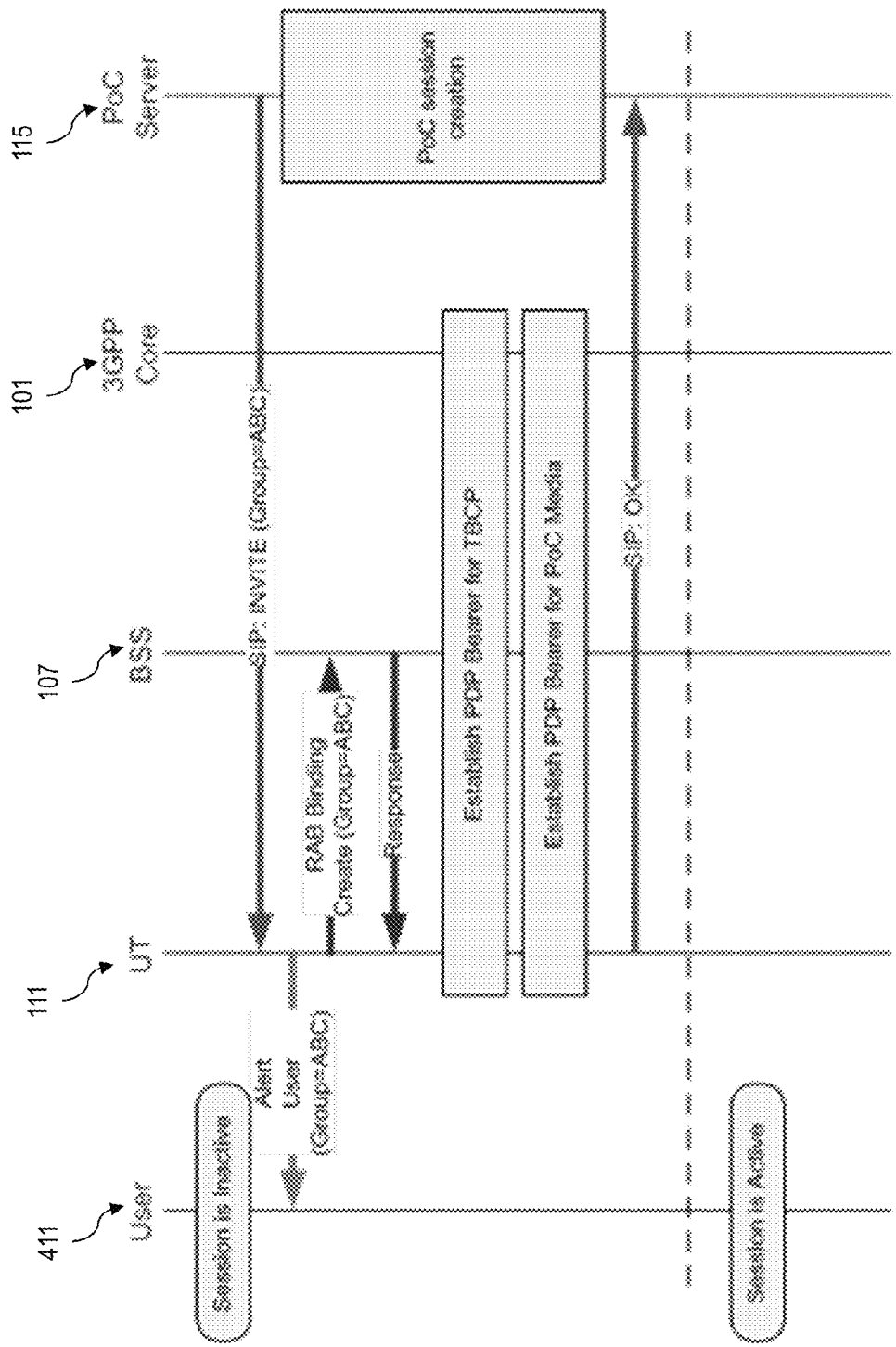
FIG. 4B illustrates a radio access bearer (RAB) binding process for new a PoC session, using on-demand signaling, initiated at a PoC server, in accordance with an example embodiment.

In accordance with a further example embodiment, FIG. 4B illustrates a radio access bearer (RAB) binding process for new a PoC session, using on-demand signaling, initiated at a PoC server. In this case, the PoC server 115 initiates the session, using on-demand signaling procedures, by first sending the SIP invite message via the SIP bearer to the UT 111, (including the common GID for the PoC group or session). According to this embodiment, therefore, the UT 111 is the terminating party in the PoC session, and is informed of the group identity through the SIP invite message from the PoC server 115. The UT 111 then sends the RAB binding information to the SRAN 107, identifying the PDP bearers and the RABs that will be used for PoC talk burst control and voice media, as well as the GID identifying the PoC group or session. The SRAN 107 sends a RAB binding response or acknowledgement message back to the UT 111. Once the response is received, the UT 111 and the CN 101 set up the PDP bearers for the TBCP and the PoC media, and the UT sends a SIP OK response message (acknowledging the SIP invite) via the SIP bearer back to the PoC server 115. In the meantime, the PoC server 115 creates the session.

These processes of FIGS. 4A and 4B are compatible with network-initiated as well as with terminal-initiated Bearer Control Modes.

Figure 4C:
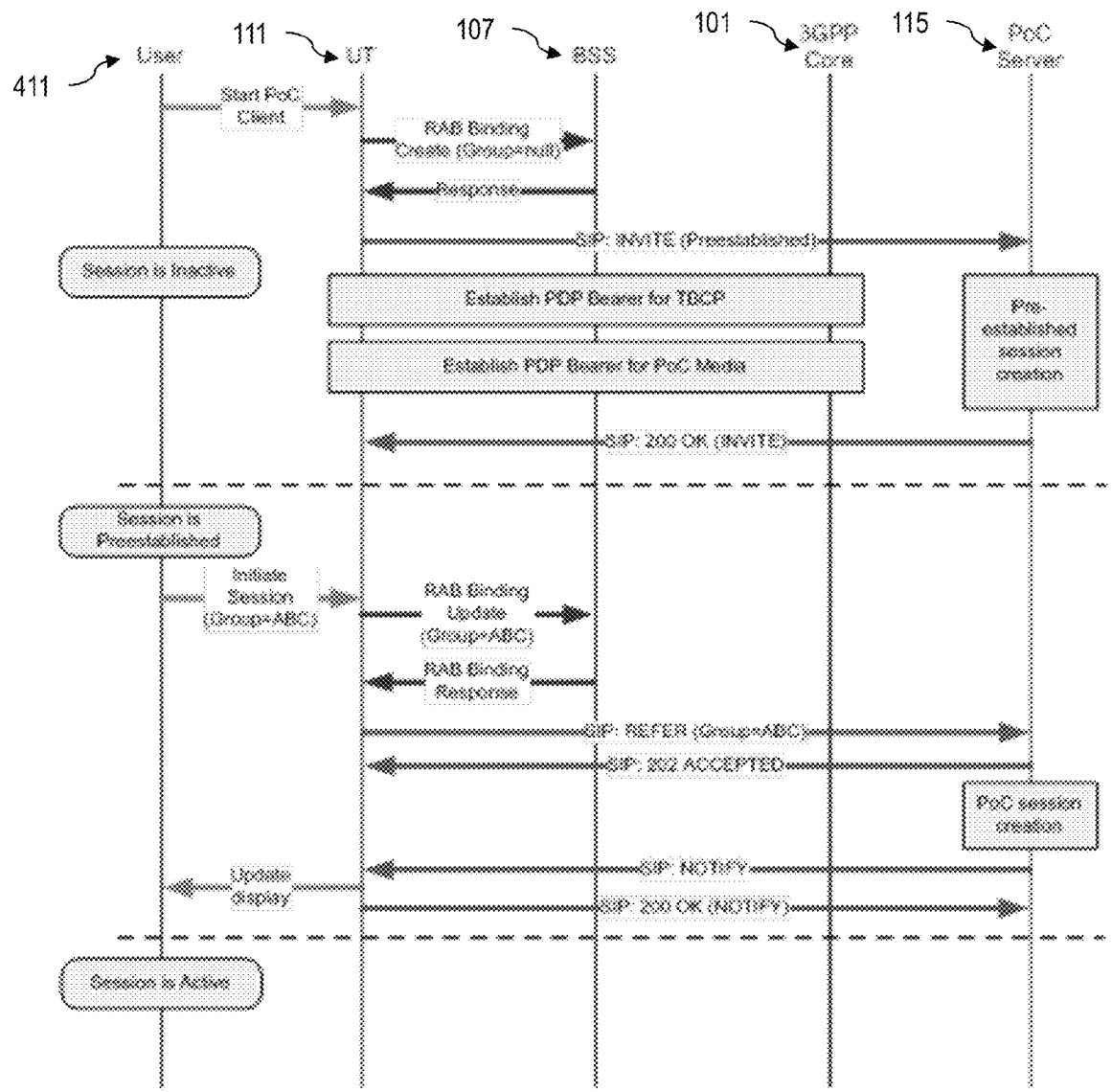
FIG. 4C illustrates a radio access bearer (RAB) binding process for a PoC session initiated at a host terminal (originating side), where the PoC session is based on a pre-established session, in accordance with an example embodiment.

In accordance with a further example embodiment, FIG. 4C illustrates a radio access bearer (RAB) binding process for a PoC session initiated at the host terminal (originating side), where the PoC session is based on a pre-established session. As is evident from FIG. 4C, when using a pre-established PoC session, the SIP handshake and establishment of the PoC PDP bearers may occur well in advance of the activation of the session. The User 411 initiates the PoC client or application on the UT 111. The UT 111 then sends the RAB Binding information to the SRAN 107, identifying the PoC PDP bearers and RABs, and then sets up the PDP bearers. The PoC group or session identification (GID) is not known at this time (the GID is a null in the RAB binding information). The SRAN 107 sends a RAB binding response or acknowledgement message back to the UT 111. Once the UT 111 receives the response, the UT sends a SIP invite message via the SIP bearer to the PoC server 115, indicating in advance the media and session related parameters that would be used in an ensuing PTT session. The UT 111 and the CN 101 set up the PDP bearers for the TBCP and for the PoC media (which will be used for the PoC session), and the PoC server 115 creates the pre-established session. The PoC server 115 completes the process by sending a SIP OK message (acknowledging the SIP invite) via the SIP bearer back to the UT 111.

At the point in time that the User 411 desires to activate the session, the User initiates the session, identifying the group. The UT 111 then sends a RAB binding update message to the SRAN 107, and the SRAN provides a RAB binding response or acknowledgement to the UT. Upon receiving the response, the UT 111 sends a SIP Refer message via the SIP bearer to the PoC server 115, including the GID, and the PoC server sends a SIP accepted response message (acknowledging the SIP refer message) via the SIP bearer back to the UT. Further, because the PoC server already knows that the UT 111 has a pre-established session, the message triggers the PoC server to use the media and session parameters indicated during the pre-establishment signaling for the session. The PoC server 115 then creates the PoC session based on media and session parameters specified during the pre-establishment signaling, and sends a SIP notify message via the SIP bearer to the UT 111. The UT 111 updates its display to notify the User 411 that the session is now active, and sends a SIP OK response message (acknowledging the SIP notify message) via the SIP bearer back to the PoC server 115.

Figure 4D:
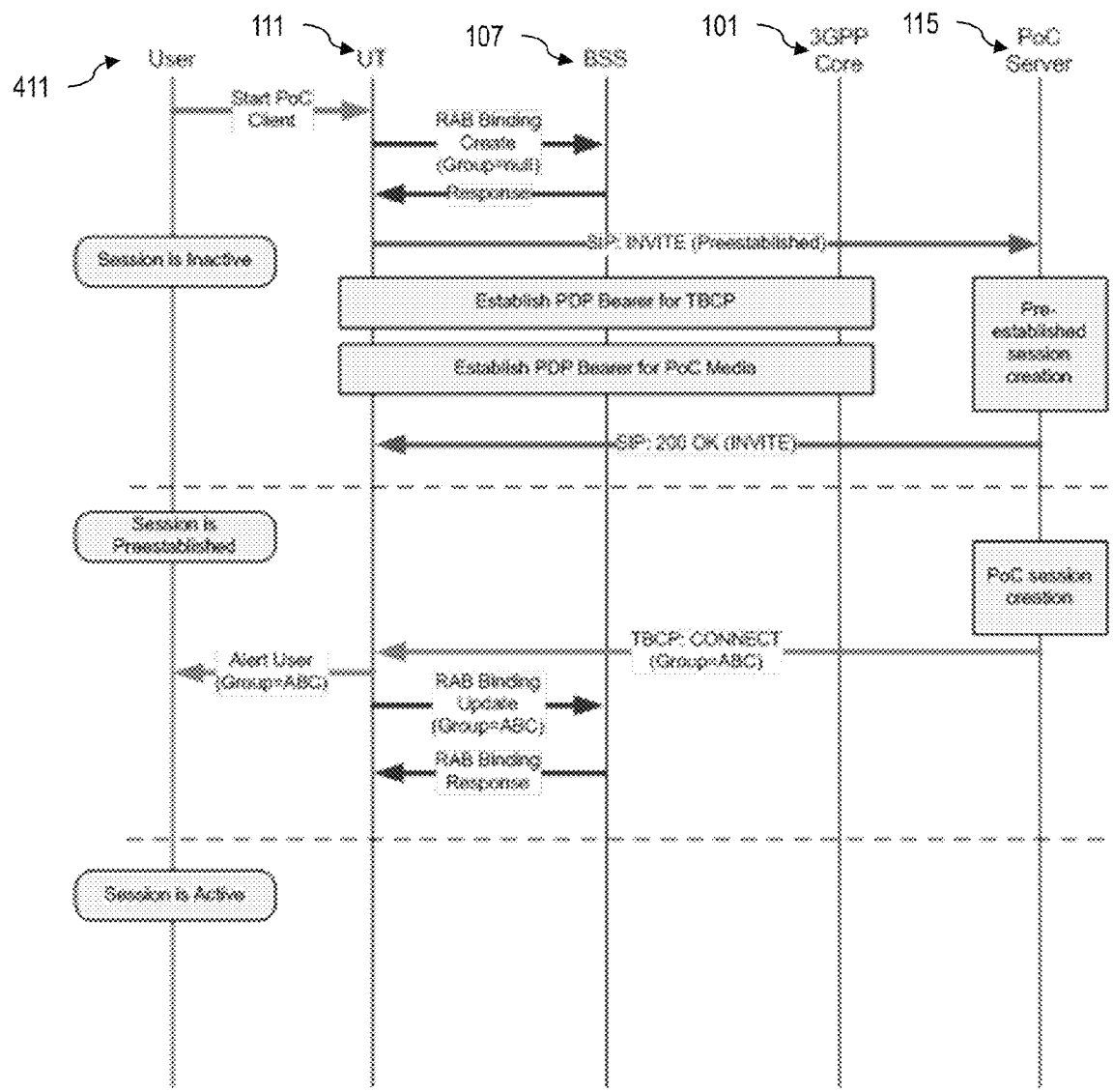
FIG. 4D illustrates a radio access bearer (RAB) binding process for a PoC session initiated at a PoC server (terminating side), where the PoC session is based on a pre-established session, in accordance with an example embodiment.

In accordance with a further example embodiment, FIG. 4D illustrates a radio access bearer (RAB) binding process for a PoC session initiated at a PoC server (terminating side), where the PoC session is based on a pre-established session. In this instance, the process for the RAB binding and the establishment of the PD bearers and the pre-established session is performed in the same manner as with the pre-established session described above with respect to FIG. 4C. The User 411 initiates the PoC client or application on the UT 111. The UT 111 sends the RAB Binding information to the SRAN 107 (with a null GID), and sets up the PDP bearers. The SRAN 107 sends a RAB binding response or acknowledgement message back to the UT 111, and the UT sends a SIP invite via the SIP bearer to the PoC server 115. The UT 111 sets up the PDP bearers, and the PoC server 115 creates the pre-established session and sends a SIP OK message (acknowledging the SIP invite) via the SIP bearer back to the UT. At the point in time that the session is to be activated (based on a PoC session initiated by another UT—the UT 111 is on the terminating side), the PoC server 115 creates the PoC session based on media and session parameters specified during the pre-establishment signaling, and sends a TBCP connect message via the TBCP bearer, identifying the group (providing the GID). The UT 111 then alerts the User 411 (e.g., via the UT display) and sends a RAB binding update message to the SRAN 107, and the SRAN provides a RAB binding response or acknowledgement back to the UT.

Accordingly, when a PoC session is activated using a pre-established session, the UT 111 updates the RAB Binding information previously sent, adding the PoC group or session identification (GID). The RAB binding update can be performed on the originating side as well as on the terminating side using the same mechanism—the GID is provided either by the UT 111 (originating side) via a SIP refer message, or by the PoC server 115 (the terminating side) via a TBCP connect message.

Figure 5A:
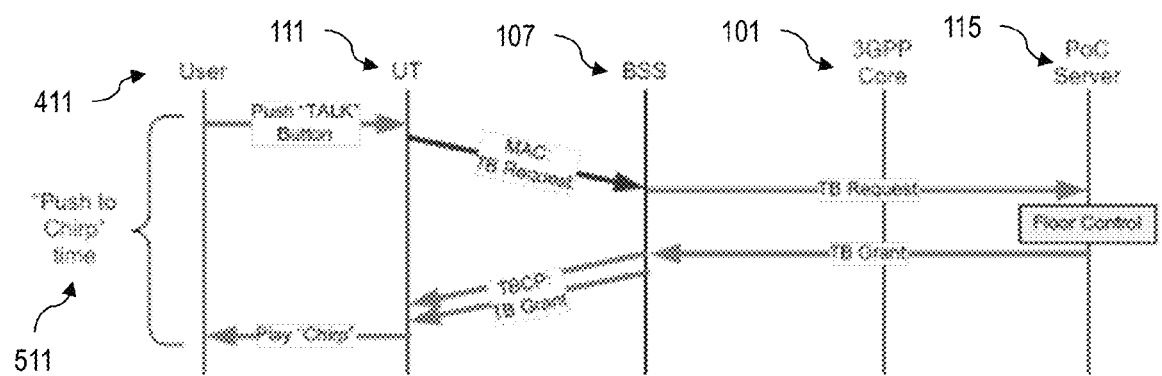
FIG. 5A illustrates the Push-to-Chirp time based on a resource efficient Uplink Talk Burst Control process, in accordance with an example embodiment.

Efficient Uplink Talk Burst Control Messaging and Resource Allocation:

FIG. 5A illustrates the Push-to-Chirp time 511 based on a resource efficient Uplink Talk Burst Control process, in accordance with an example embodiment. Once a PoC session has been established and activated, the push-to-chirp time 511 reflects the time period between the time that the User 411 initiates the talk button on the UT 111 and the time that the UT 111 is provided with control of the floor (the UT has floor control for transmitting the User PoC session data, such as speech), which is identified by a signal presented by the UT (e.g., a chirp or tone emitted by the UT). In accordance with an example embodiment, a protocol is provided whereby the UT 111 transmits the Talk Burst Control messaging transmits (e.g., the Talk Burst Request, Talk Burst Release and Talk Burst Acknowledge (Ack) messages) via small MAC layer control messages. When the SRAN receives these special MAC control messages, containing an indication of Talk Burst Request, Talk Burst Release or Talk Burst Ack, the SRAN generates a full Talk Burst Control message and forwards it on to the PoC server. In that manner, the transmission of the Talk Burst Control messaging is transmitted based on reduced resource requirements and reduced latency, as compared to typical or standard protocol(s). Such MAC layer control messages require significantly less time to transmit than the standard or typical TBCP messages, which potentially require multiple radio transmissions due to segmentation at the data link layer. Furthermore, according to this messaging protocol, the UT can use an uplink allocation on any other radio bearer to transmit these control messages, and, if no suitable uplink resource allocation is available, then the UT can transmit the messages on a contention channel. In other words, based on this protocol, there is no need for the UT to request a specific uplink resource allocation to transmit the control messages. Accordingly, these measures significantly reduce the latency in transmission of Talk Burst Control messages by the UT.

Figure 5B:
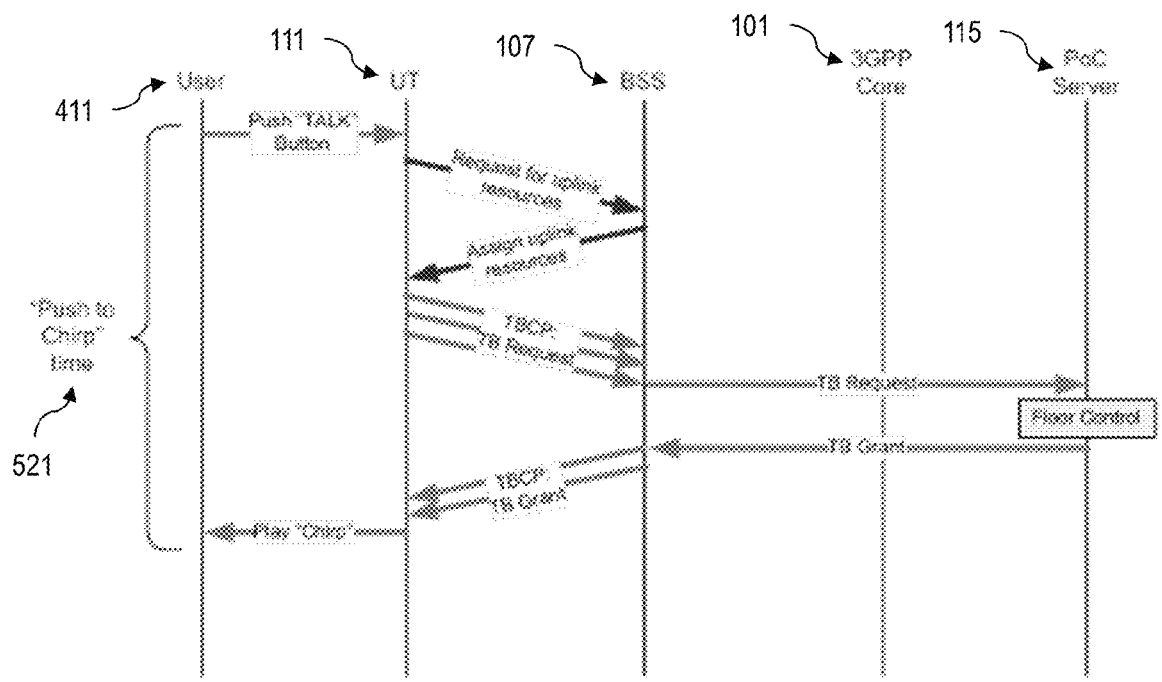
FIG. 5B illustrates the Push-to-Chirp time based on a traditional Uplink Talk Burst Control process.

By way of example, with reference to FIG. 5A, upon activation of the talk button, the UT 111 transmits the Talk Burst Request (TB Request) message, encoded into a small MAC layer control message, to the SRAN 107. The SRAN 107 then forwards the TB Request message to the PoC server 115 via the TBCP bearer. At an appropriate time, the PoC server relinquishes the floor control to the UT 111, and sends a Talk Burst Grant (TB Grant) message back to the SRAN 107 via the TBCP bearer. The SRAN 107 then sends a TB Grant response message via the TBCP bearer to the UT 111 (note: the Figure includes two lines representing this message to indicate that more than one frame may very well be required to transmit one TBCP message), notifying the UT that it has been granted the floor control by the PoC server 115. Upon receiving the TB Grant response message, the UT 111 notifies the User 411 (e.g., via a chirp sound) that the User now has the floor for transmission of media (e.g., voice messages). For comparison, FIG. 5B illustrates an example of the Push-to-Chirp time based on a traditional or standard Uplink Talk Burst Control process. As is evident from this illustration, from the time that the User 411 activates the talk button, before the UT 111 can transmit the TB Request message to the PoC server 115, the UT must first request and be granted uplink resources for transmission of the message. Further, under the traditional model, the UT 111 transmits the TB Request message via the TBCP bearer (note: the Figure includes three lines representing this message to indicate that more than one frame may very well be required to transmit one TBCP message), which introduces additional latency over the MAC layer request.

Figure 5C:
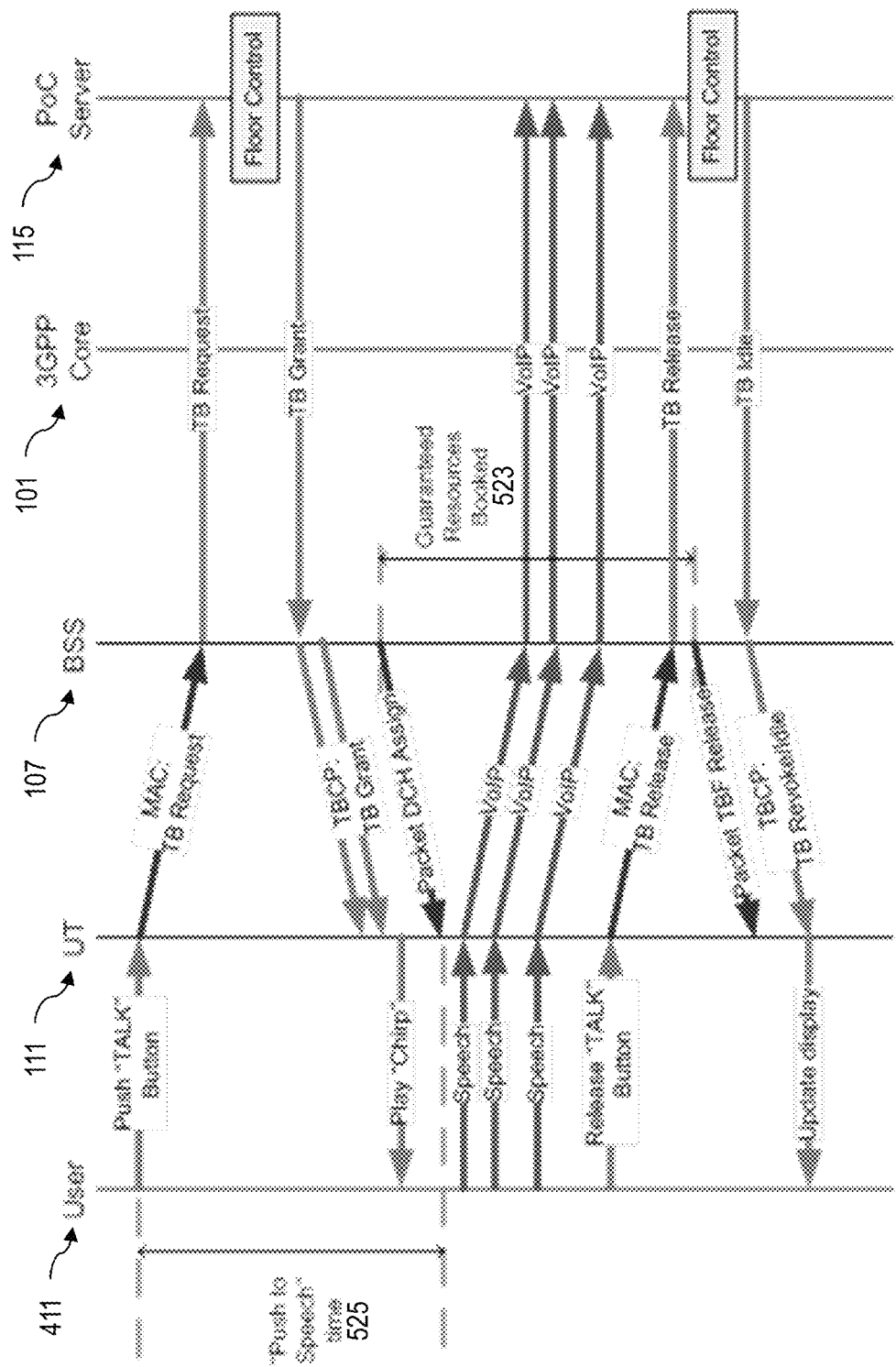
FIG. 5C illustrates uplink resource efficiencies based on the half-duplex nature of a PoC session or service, in accordance with an example embodiment.

FIG. 5C illustrates uplink resource efficiencies, achieved based on the half-duplex nature of a PoC session, in accordance with an example embodiment. By way of example, the SRAN 107 examines the downlink Talk Burst Control messages sent by the PoC server 115 to each host terminal and interprets them as resource allocation hints. For example, the SRAN 107 assigns guaranteed booked uplink resources (GBUR) 523 to a host terminal (e.g. the UT 111) when a Talk Burst Grant addressed to that host terminal is observed. Similarly, the SRAN 107 withdraws the GBUR 523 from the host terminal currently holding the floor control when a Talk Burst Release from that host terminal is observed, or when a Talk Burst Revoke message or Talk Burst Idle message addressed to that host terminal is observed. This protocol achieves significant benefits over the current traditional or standard processes. For example, by using the floor control state of the PoC session to drive the uplink resource assignment, it ensures that no more than one participant host terminal is assigned GBUR 523 at any time, no matter how many host terminals are participating in the session. Whereas, pursuant to the typical or standard PoC service architectures and protocols, each participant guaranteed reserved resources throughout the session. Further, using the downlink Talk Burst Control messages as a resource allocation triggers, eliminates the typical latency with packet bearers, associated with requesting and waiting for uplink resources to be assigned. This reduces the Push-to-Speech time 525—the time between the activation of the talk button of the UT 111 and the assignment/notification of the guaranteed resources to the UT. Additionally, the uplink allocation and release is done using MAC layer resource assignment procedures (in contrast to the traditional or standard protocols, which utilize radio bearer setup, release and reconfiguration messaging, transmitted via RRC messages that are more expensive in terms of number of bits in the message), greatly reducing signaling overhead and latency.

More specifically, with reference to FIG. 5C, once the SRAN sends the TB Grant message to the UT 111 (indicating that the floor control has been relinquished to the UT), the SRAN books guaranteed resources on the SPDPC bearer for the PoC media, and transmits a Packet DCH Assign message to the UT via a MAC layer control message, assigning the respective slots to the UT for transmission of the PoC media via the SPDPC bearer for the PoC media?]. Then, when the UT 111 receives speech from the User 411, the UT sends corresponding voice messages as voice over IP (VoIP) packets, via the assigned slots of the PoC media SPDPC bearer. When the User 411 completes the voice message, the talk button of the UT 111 is released, upon which time the UT sends a TB Release MAC layer message to the SRAN 107. The SRAN 107 then sends a Packet Temporary Block Flow (TBF) message to the UT 111, again via a MAC layer message, and sends a TB Release message via the TBCP bearer to the PoC server 115. The PoC server 115 revokes the floor control from the UT 111, and sends a TB Idle message to the SRAN 107 via the TBCP bearer. The SRAN 107 then sends a TB Revoke/Idle message to the UT 111 via the TBCP bearer, and the UT informs the User 411 (e.g., via the UT display) that the floor control has been revoked. Accordingly, the UT 111 is allocated guaranteed booked resources 523 only during the time period that the UT 111 maintains the floor control (e.g., the time period from the transmission of the Packet DCH Assign message by the SRAN 107 to the transmission of the Packet TBF Release message by the SRAN 107).

Figure 5D:
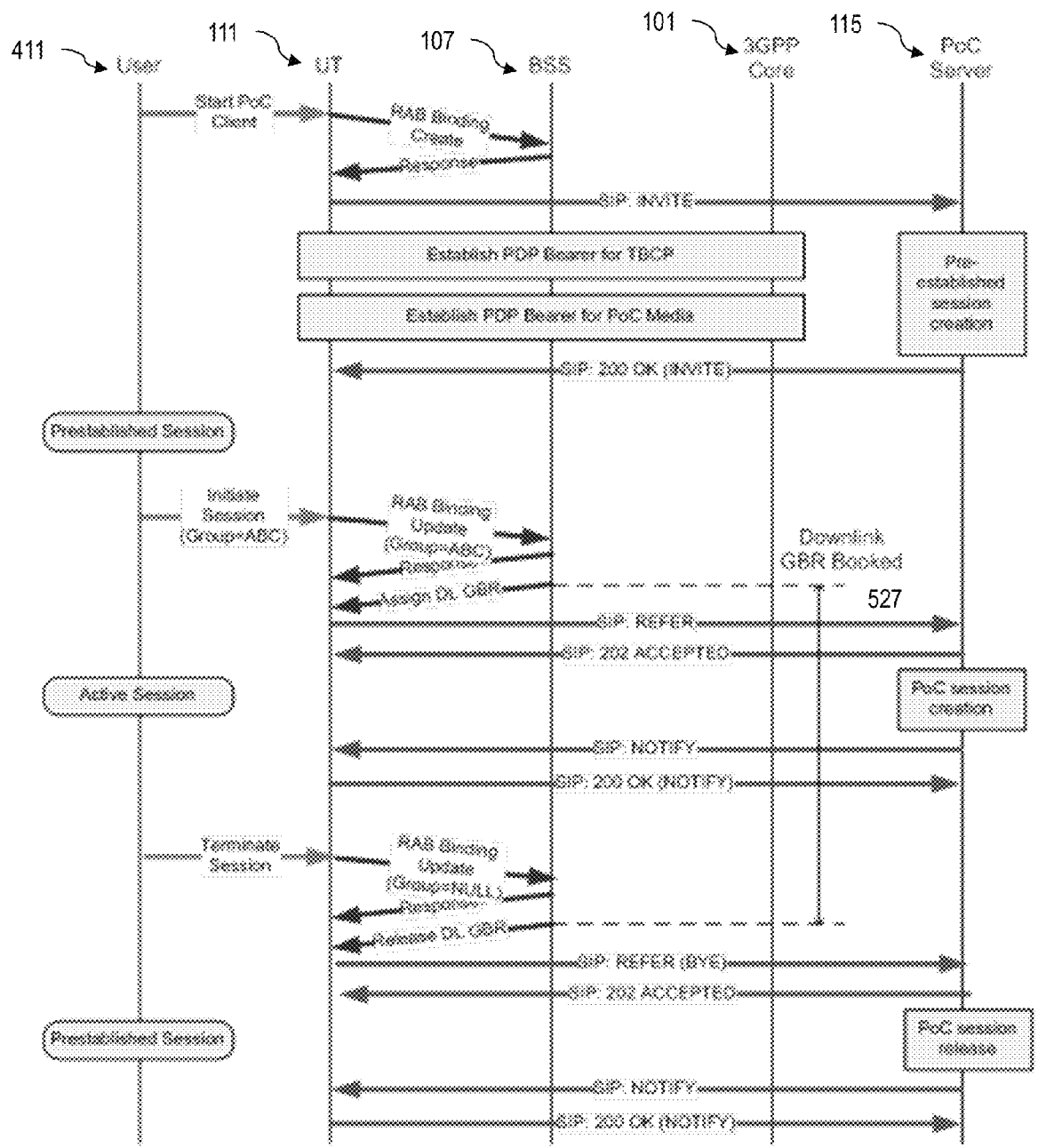
FIG. 5D illustrates downlink resource efficiencies of a PoC session initiated at a host terminal (originating side), where the PoC session is based on a pre-established session, in accordance with an example embodiment.
Figure 5E:
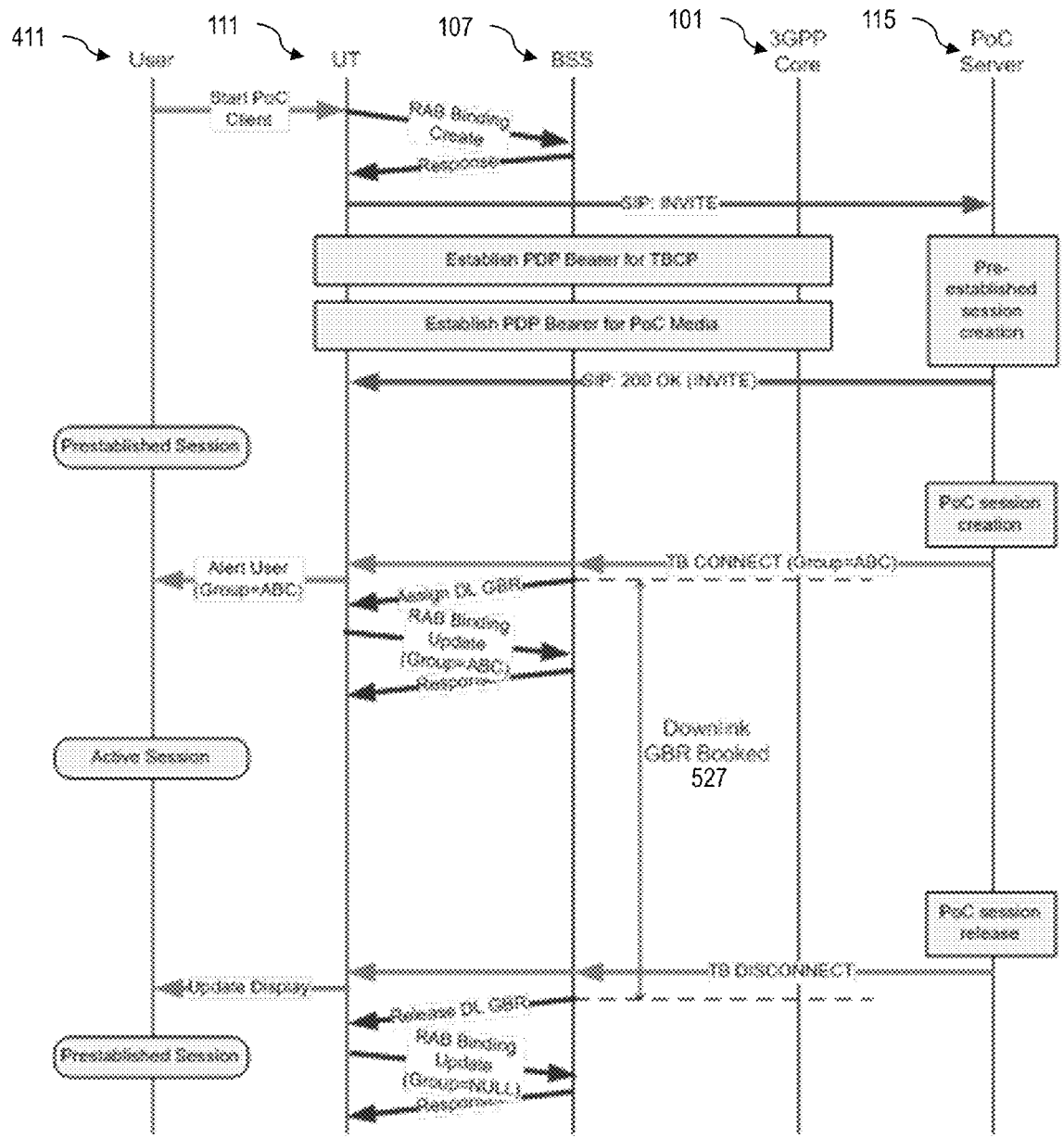
FIG. 5E illustrates downlink resource efficiencies of a PoC session initiated at a PoC server (terminating side), where the PoC session is based on a pre-established session, in accordance with an example embodiment.

FIG. 5D illustrates downlink resource efficiencies of a PoC session initiated at a host terminal (originating side), where the PoC session is based on a pre-established session, in accordance with an example embodiment. Further, FIG. 5E illustrates downlink resource efficiencies of a PoC session initiated at a PoC server (terminating side), where the PoC session is based on a pre-established session, in accordance with an example embodiment. As introduced above, the traditional or standard PoC protocol specifications provide for the use of pre-established sessions in order to allocate much of the resource intensive SIP call setup signaling, media parameter negotiation and PDP Context signaling required for PoC sessions to periods in time well ahead of the time that the actual PoC session will be active. PoC sessions based on pre-established session signaling thereby allow for quicker activation of the PoC session than is possible with on-demand session signaling. The use of pre-established session signaling, however, also presents the negative affect of wasted resources during the time period between the pre-establishment signaling and the initiation of the active use of the PoC session (e.g., when the pre-established resources are not actually being used in an active PoC session).

Accordingly, example embodiments of the present invention provide for the assignment of guaranteed booked downlink resources (GBDR) 527 only when the PoC session is actually active, rather than (as with the traditional or standard protocols) during the pre-established session stage. By way of example, in order to manage downlink resources for pre-established sessions when using a unicast PoC channel, the SRAN 107 examines RAB Binding signaling from the participating host terminals and Talk Burst Control messages sent by the PoC server 115.

For example, with reference to FIG. 5D, in the case where the PoC session activation is initiated by the UT 111 (originating side), first, the SRAN 107 identifies the use of pre-established session signaling based on the RAB Binding information provided by the UT 111 to the SRAN during the initial RAB binding process (e.g., when the User 411 initiates the PoC application or client on the UT). Next, when the UT 111 issues the RAB binding update message to the SRAN 107, associating the pre-established session with an active PoC group or session (e.g., when the User initiates the session), the SRAN 107 recognizes the initiation of the PoC session. At that point, the SRAN 107 assigns the GBDR 527 to the UT 111 for the unicast PoC channel, which begins the period of the assigned GBDR 527. The SRAN assigns the GBDR 527 via an assign GBDR message sent to the UT 111 via MAC layer messaging. The process then continues with the PoC session creation between the UT 111 and the PoC server 115 (as described above with reference to FIG. 4C). When the UT 111 issues the RAB binding update message to the SRAN 107, disassociating the pre-established session from an active PoC group or session, (e.g., when the User 411 terminates the session) the SRAN 107 recognizes the termination of the active PoC session. At this point the SRAN 107 sends a release GBDR message to the UT 111, also via MAC layer messaging, withdrawing the assigned GBDR from the UT 111, which ends the period of the assigned GBDR 527. The UT 111 and the PoC server 115 then exchange SIP signaling for release of the PoC session. Namely, the SIP refer (bye) message to the PoC server 115, and the response accepted (acknowledgment) message returned to the UT 111, transmitted via the SIP bearers; and (after the PoC session release) the SIP notify (confirming the session release) sent to the UT 111, and the SIP OK response returned to the PoC 115, again transmitted via the SIP bearers.

Further, with reference to FIG. 5E, in the case where the PoC session activation is initiated by the PoC server 115 (terminating side), here also, the SRAN 107 first identifies the use of pre-established session signaling based on the RAB Binding information provided by the UT 111 to the SRAN during the initial RAB binding process (e.g., when the User 411 initiates the PoC application or client on the UT). Then, when the SRAN 107 observes the TB Connect message from the PoC 115 server to the UT (indicating that a PoC session has become active based on the pre-established session, and identifying the group or session, e.g., providing the GID), the SRAN assigns the GBDR to the UT 111 for the unicast PoC channel, via MAC layer transport messaging. At this point, the period of the GBDR 527 begins. Then, when the SRAN 107 observes a TB Disconnect sent from the PoC server 115 to the UT 111 (indicating that the PoC session has been released) the SRAN 107 sends a release GBDR message to the UT 111, also via MAC layer messaging, withdrawing the assigned GBDR from the UT 111, which ends the period of the assigned GBDR 527. The UT 111 then sends a RAB binding update message to the SRAN 107 (resetting the GID to null), and the SRAN sends a response message to the UT acknowledging the RAB binding update.

Accordingly, in the cases of PoC sessions based on pre-established session signaling, such example embodiments provide for efficient assignment of downlink guaranteed booked resources only when a pre-established session is being used for an active PoC session. When PoC session activation or release is originated by a host terminal (the originating side), the SRAN utilizes RAB binding signaling as the trigger for downlink guaranteed resource allocation and de-allocation, whereas, when PoC session activation is signaled from the PoC server (the terminating side), the SRAN utilizes the Talk Burst signaling from the PoC server as the trigger for downlink guaranteed resource allocation and de-allocation.

Figure 5F:
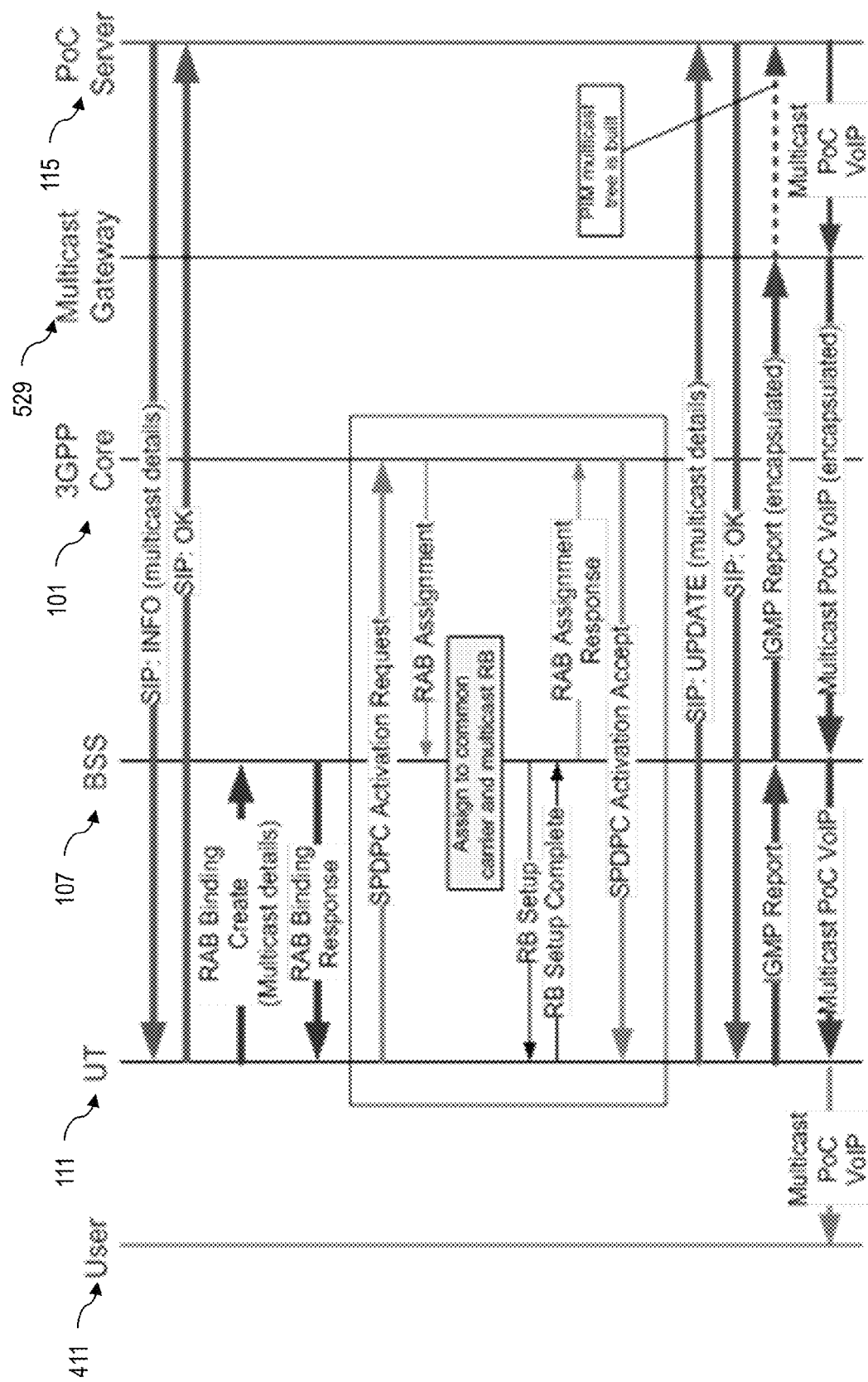
FIG. 5F illustrates a process for channel activation for a multicast PoC session, in accordance with an example embodiment.

Efficient Downlink Resource Allocation Using Multicast:

In accordance with further example embodiments, efficient utilization of forward link resources in multicast PoC services is provided. By way of example, FIG. 5F illustrates a process for channel activation for a multicast PoC session, in accordance with an example embodiment. When Radio Access Bearers (RABs) of a given cell or satellite beam can be identified as being associated with a Multicast PoC channel for the same PoC group or session, the SRAN 107, for example, assigns such RABs to a multicast radio bearer on a common radio carrier. This ensures that all participating host terminals with respect to that multicast PoC session would then receive a common downlink resource allocation by which they all would receive the same media stream by listening to the same multicast downlink transmission. Accordingly, this approach achieves a significant level of efficiency in downlink resource usage, translating into significant savings in downlink radio resources (e.g., transmission power and spectral resources).

With reference to FIG. 5F, a UT 111 that supports multicast PoC service features will indicate its support of such features to the PoC server 115 during the initial PoC session establishment signaling (e.g., as described above with respect to FIG. 4A), via a feature code provided to the PoC server (e.g., by means of the feature code "g.poc.multicast"). The PoC server then sends a Multicast PoC Channel Announcement to all PoC session participant host terminals that support the multicast PoC features. The announcement takes the form of a SIP INFO message containing the multicast bearer details, including the IP multicast group address (MGID) to be used. Each such host terminal desiring to join the multicast PoC (e.g. UT 111) then performs the RAB Binding Create procedure, informing the SRAN 107 of its intent to establish an SPDPC bearer associated with the IP multicast group identified by the MGID. The SRAN 107 uses the RAB binding messages from the UT 111 and other participating UTs within the same cell to identify the set of multicast PoC bearers in that same cell participating in the same multicast PoC session (operating on the same multicast PoC channel).

Then when the participating UTs activate the identified SPDPC bearers, the SRAN 107 assigns them to a common radio carrier and a common multicast radio bearer or transmission channel. For example, the UT 111 sends an SPDPC Activation Request message to the CN 101, and the CN 101 sends a corresponding RAB assignment message to the SRAN 107. The SRAN 107 then assigns the respective bearer to the common carrier and multicast radio bearer, and exchanges radio bearer setup messages with the UT 111. Once set up, the SRAN 107 sends a RAB assignment response message to the CN 101 (acknowledging the RAB assignment), and the CN 101 sends an SPDPC Activation Accept message to the UT 111.

After the bearer activation is complete, each participating host terminal notifies the PoC server that it wishes to join the Multicast PoC Channel, which is accomplished via a SIP Update message (including the required multicast information, such as the multicast media stream transport information) transmitted to the PoC server 115. For example, the UT 111 transmits the SIP Update message to the PoC 115 via the SIP bearer, in response to which the PoC server transmits the SIP OK message back to the UT 111.

The participating host terminals then begin monitoring the Multicast PoC Channel. By way of example, the UT 111 transmits the IGMP signaling via the SPDPC bearer to the Multicast Gateway (MCG) 611, which triggers the construction of a multicast routing tree mapping from the MCG 611 back to the PoC server 115. The PoC server transmits a multicast VoIP data stream, which can be received by all participating host terminals (e.g., UT 111) via a common multicast radio resource in each cell or satellite beam in which at least one participating hos resides. The system architectures and methods (e.g., protocols) employed for such resource-efficient IP multicast are described more fully in co-pending U.S. patent application Ser. No. 13/900,501, filed May 22, 2013, to Ravishankar et al. and titled "SYSTEM AND METHOD FOR EFFICIENT USE OF RADIO RESOURCES IN MULTICAST SERVICES IN MOBILE WIRELESS COMMUNICATIONS SYSTEMS," the entirety of which is incorporated herein by reference.

Figure 6:
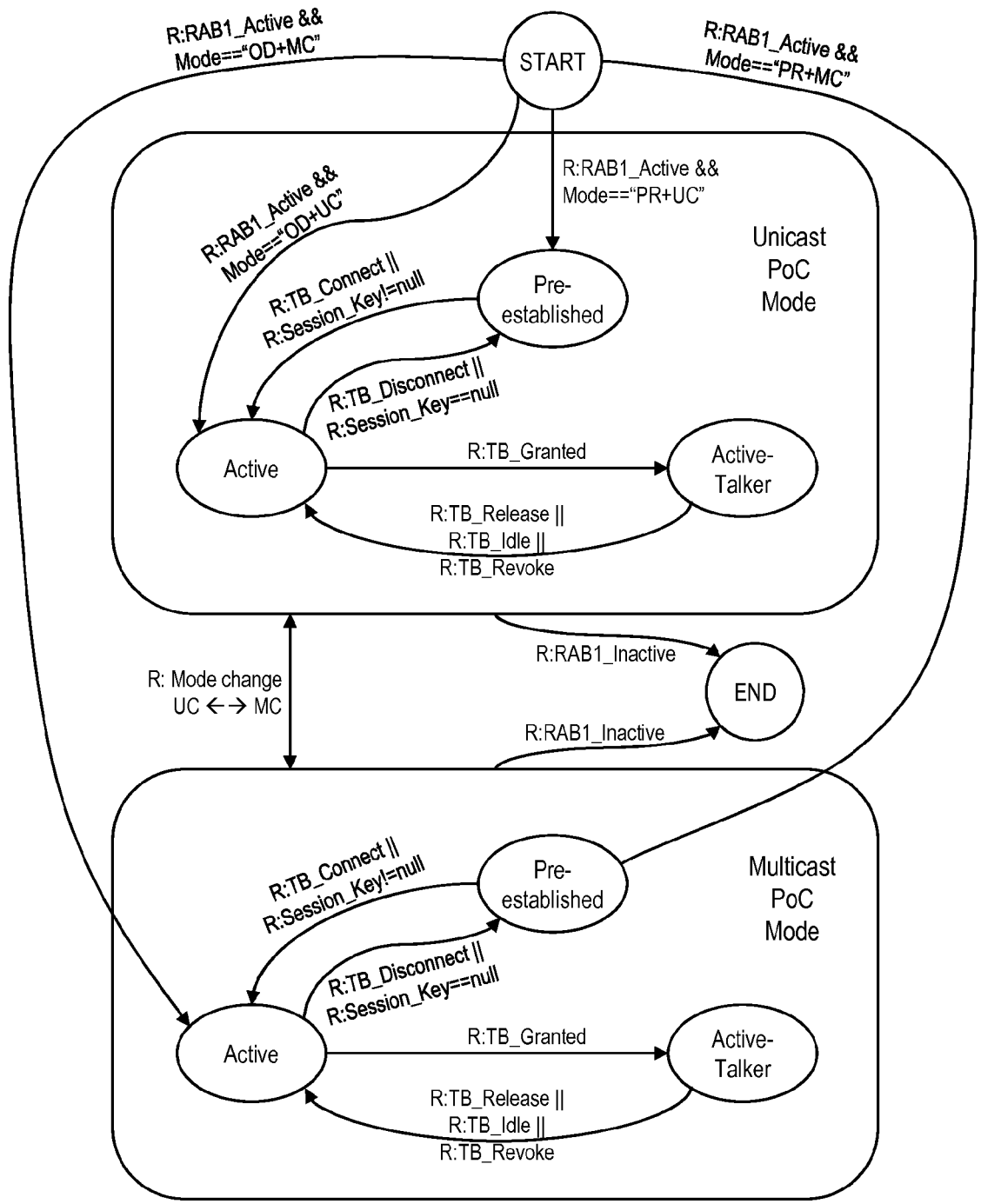
FIG. 6 illustrates a state diagram depicting a summary of various transitions between different states and modes, as driven by Radio Resource Control (RRC) Radio Access Bearer (RAB) Binding signaling and PoC Talk Burst Control Protocol (TBCP) floor control signaling, in accordance with example embodiments.

FIG. 6 illustrates a state diagram depicting a summary of various transitions between different states and modes, as driven by Radio Resource Control (RRC) Radio Access Bearer (RAB) Binding signaling and PoC Talk Burst Control Protocol (TBCP) floor control signaling, in accordance with example embodiments. With reference to FIG. 6, the following provides a summary of the efficient allocation of bearer resources with respect to different combinations of pre-established and on-demand signaling, unicast and multicast channels. By way of example, the illustrated rules are implemented in the Resource Management function of the SRAN 107.

The following resource management-related session states are defined: (1) Pre-established, whereby (a) the session is pre-established but not activated, and (b) the TBCP bearer is assigned best-effort resources, but the media bearer has no resources assigned; (2) Active, whereby (a) the User is in an active session as a listener, (b) the TBCP bearer is assigned best-effort resources, (c) in unicast PoC mode, the unicast PoC channel media bearer has guaranteed downlink resources booked, but no uplink resources assigned, and (d) in multicast PoC mode, the shared multicast PoC channel bearer has guaranteed downlink resources booked and the unicast PoC channel media bearer has no resources assigned; and (3) Active-Talker, whereby (a) the User is in an active session and has permission to talk, (b) the TBCP bearer is assigned best-effort resources, (c) in unicast PoC mode, the unicast PoC channel media bearer has guaranteed downlink resources booked, and guaranteed uplink resources assigned, and (d) in multicast PoC mode, the shared multicast PoC channel bearer has guaranteed downlink resources booked, and the unicast PoC channel media bearer has guaranteed uplink resources assigned.

Figure 7A:
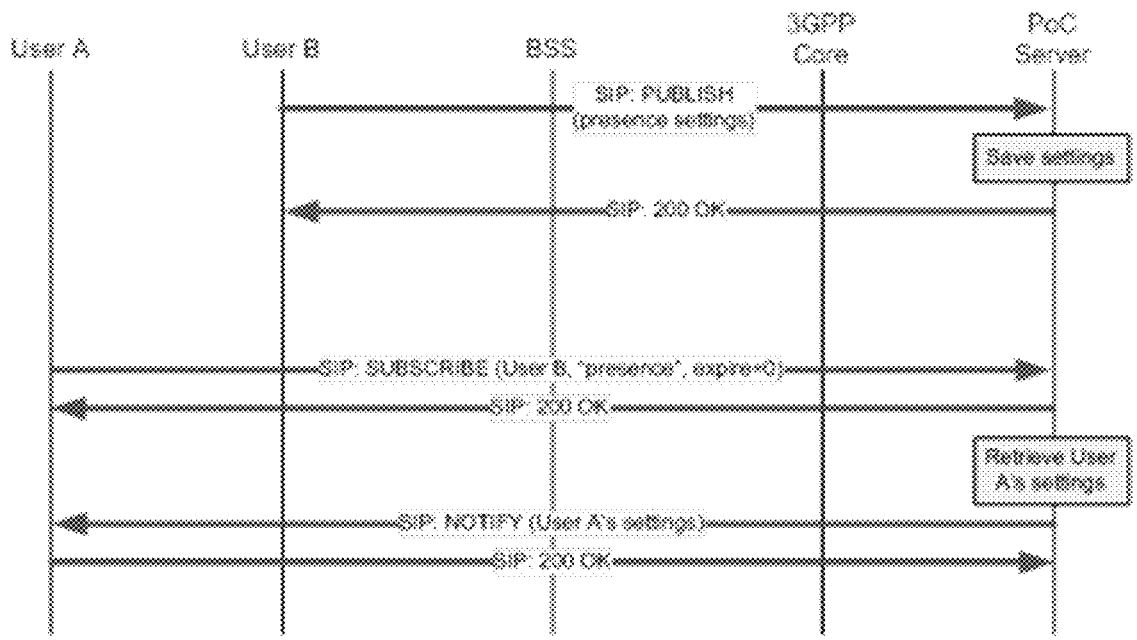
FIG. 7A illustrates a resource efficient process for providing Pull-Mode subscriber presence updates using a one-shot subscription approach, in accordance with an example embodiment.
Figure 7B:
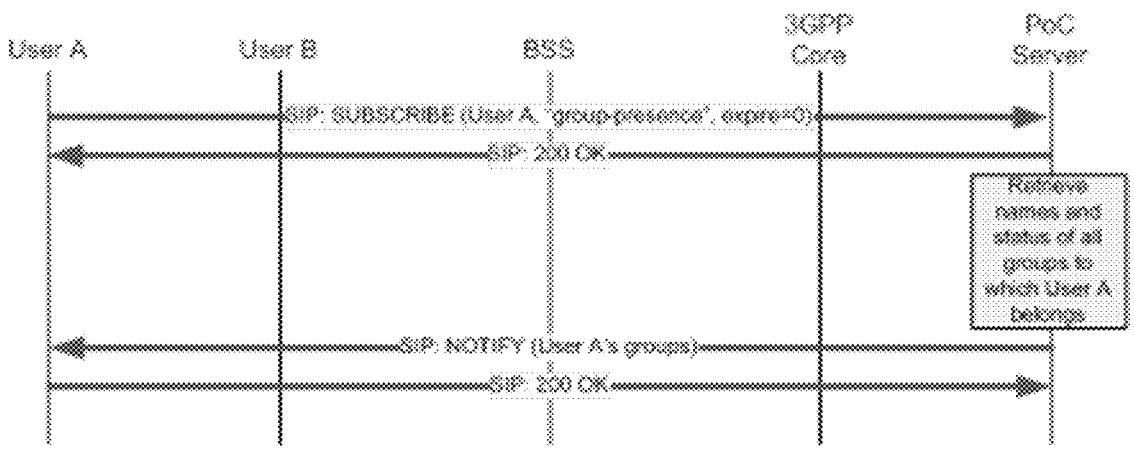
FIG. 7B illustrates a resource efficient process for providing Pull-Mode group presence updates using a one-shot subscription approach, in accordance with an example embodiment.

Resource Efficient "Pull" Mode Subscriber (User) and Group Presence:

FIGS. 7A and 7B illustrate resource efficient processes for providing Pull-Mode subscriber and group presence updates using a one-shot subscription approach, in accordance with example embodiments. Subscriber presence includes the subscriber's willingness and availability to participate in PoC sessions, the subscriber's willingness and ability to receive instant personal alerts, and the subscriber's current participation status in a PoC session. A UT publishes its presence settings at the PoC server by means of the SIP Publish process. This is done initially on registration by the UT, and then updated when the UT status changes due to user action (e.g., by the User selecting a "do not disturb" status).

By way of example, with reference to FIG. 7A, when User A wishes to obtain the status of User B, User A uses the SIP Subscribe process to register interest in the "presence" status of User B, specifying an "expire" value of zero. This represents a request for an immediate one-shot status update. IN response the PoC server 115 looks up the current presence settings of User B and provides them to User A, pursuant to a SIP Notify message, wherein the message content is compressed over the air by means of SIGCOMP or other techniques to further increase the resource efficiency of the presence function. If User A wants another update at some later point in time, it repeats the one-shot subscription request.

By way of further example, with reference to FIG. 7B, a similar method is used to obtain "group presence." "Group presence" includes a list of all the PoC groups to which a user belongs, and the current session status of each (e.g., active or inactive). When User A wishes to obtain the list of groups it belongs to and the current status of each, User A uses the SIP Subscribe process to register interest in the "group-presence" status of User A (itself), specifying an "expire" value of zero. This represents a request for an immediate, one-shot status update. The PoC server looks up the list of the current groups to which User A belongs, and their session status, and provides them to User A, via a SIP Notify message. Again, the message content is compressed over the air by means of SIGCOMP or other techniques to further increase the resource efficiency of the group presence function. If User A wants another update at some later point in time, it repeats the one-shot subscription request.

PSTN Participation in PoC Sessions:

The standard PoC service (as specified by OMA) is designed to provide push-to-talk service to subscribers in a cellular radio network. In accordance with example embodiments, however, processes are provided to facilitate the participation of Public Switched Telephone Network (PSTN) host terminals in PoC sessions over IP networks (e.g., 3GPP terrestrial wireless and/or satellite communications networks). By way of example, PSTN participation is accomplished via two alternate approaches.

The first approach is a Dial-Out process, whereby, when the PoC server starts a PoC group session by inviting PoC client host terminals to participate, the PoC server can also dial one or more predefined PSTN subscribers for participation. For example, when the PSTN subscribers answer the phone, they are joined to the active PoC session. In a variation of this, a PoC client UT in an active PoC session can signal the PoC server to ring (or "dial-out") a PSTN subscriber. The second approach is a Dial-In process, whereby a subscriber (via a PSTN host terminal) intending to participate in an ongoing PoC session dials a PoC server conference phone number, and enters a conference code and an authentication code (e.g., a PIN). For example, prior to the PoC session, the subscriber may have been provided a schedule for the PoC session, and the dial-in number, conference code and PIN, via e-mail or some other communication means. The PSTN subscriber dials the PoC server conference phone number, and when prompted, enters the conference code and PIN. The PoC server validates the conference code and PIN, and joins the PSTN host terminal, from which the subscriber Dialed-In, to the ongoing PoC session.

The PSTN participation feature is facilitated, for example, by a PSTN Gateway (which may be implemented in hardware, firmware, software, or a combination thereof, as would be recongnized by one of skill in the art. The PSTN Gateway functionality consists of two major functions. The first being a Media Gateway Control Function (MGCF), which translates SIP signaling to PSTN call signaling (such as SS7/ISUP). The MGCF also controls media plane resources on the Media Gateway (MGW). The second being the MGW, which trans-codes VoIP packets in the PoC session to Pulse Coded Modulation (PCM) voice samples on the PSTN side and vice versa. The MGW also converts dialed DTMF digits and tones from the PSTN side to RTP "telephone events" according to IETF RFC 2833, and vice versa.

Figure 8:
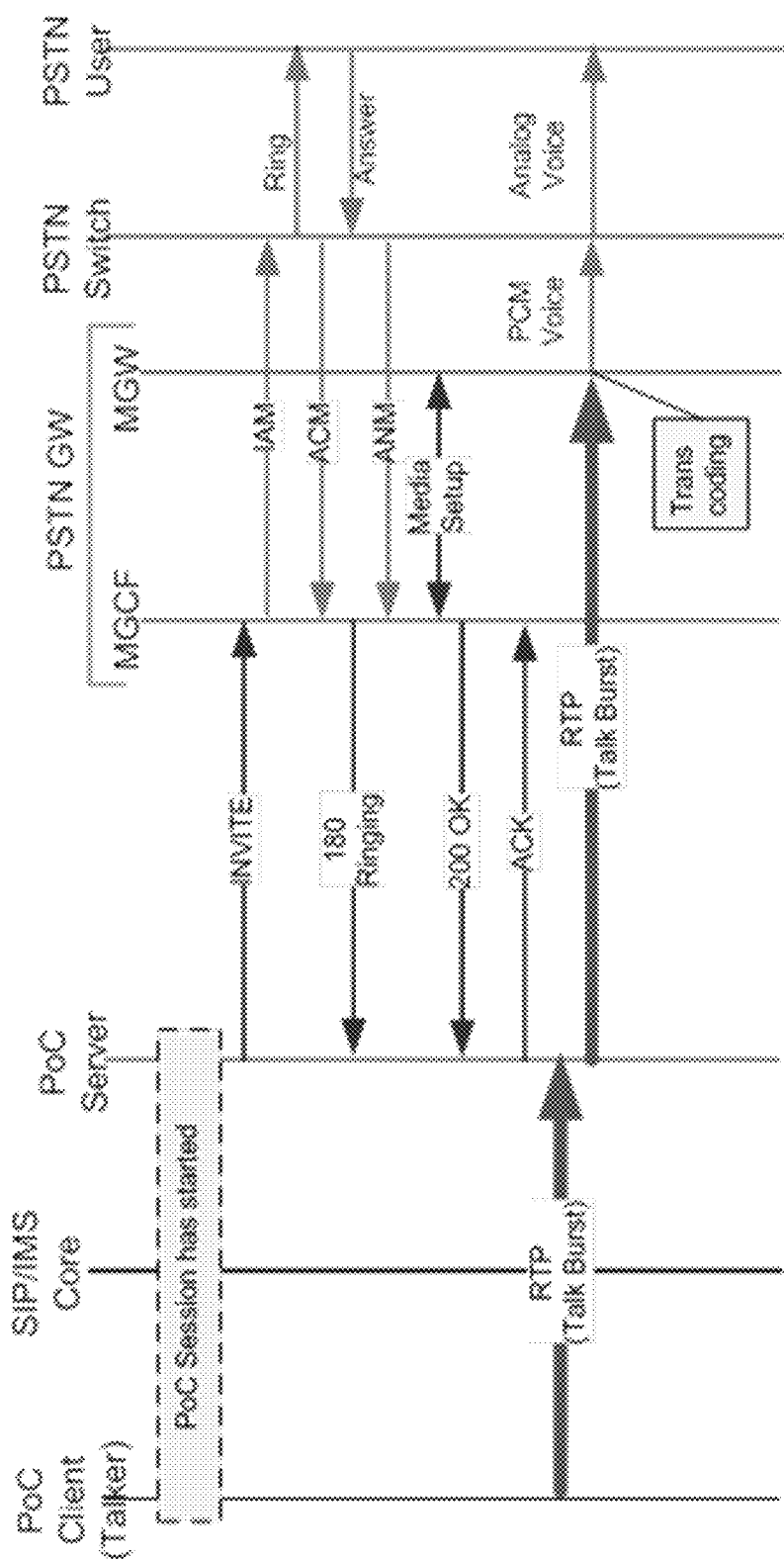
FIG. 8 illustrates a process for providing PoC session participation to a Public Switched Telephone Network (PSTN) host terminal via a Dial-Out method, in accordance with an example embodiment.

FIG. 8 illustrates a process for providing PoC session participation to a Public Switched Telephone Network (PSTN) host terminal via the "Dial-Out" method, in accordance with an example embodiment. In the context of a new PoC session or one that is already in progress, the PoC Server is triggered (by a pre-configured policy or by an explicit request from a session participant) to invite a PSTN subscriber to the session. The PoC Server sends a SIP Invite message for the PSTN subscriber (identified by a "TEL" URI) to the PSTN Gateway (PSTN GW). The MGCF converts the SIP invite to ISUP signaling and initiates a call to the PSTN host terminal (subscriber) through the PSTN. When the subscriber answers the PSTN terminal, the call setup is completed. The MGCF reserves the required trans-coding and media flow resources on the MGW and sends a final SIP OK response to the PoC Server. At this point, the PSTN host terminal is joined to the ongoing PoC session. The PoC server forwards PoC talk bursts to the MGW, which trans-codes them to PCM voice, which is passed to the PSTN switch and on to the PSTN host terminal (subscriber or user).

Figure 9:
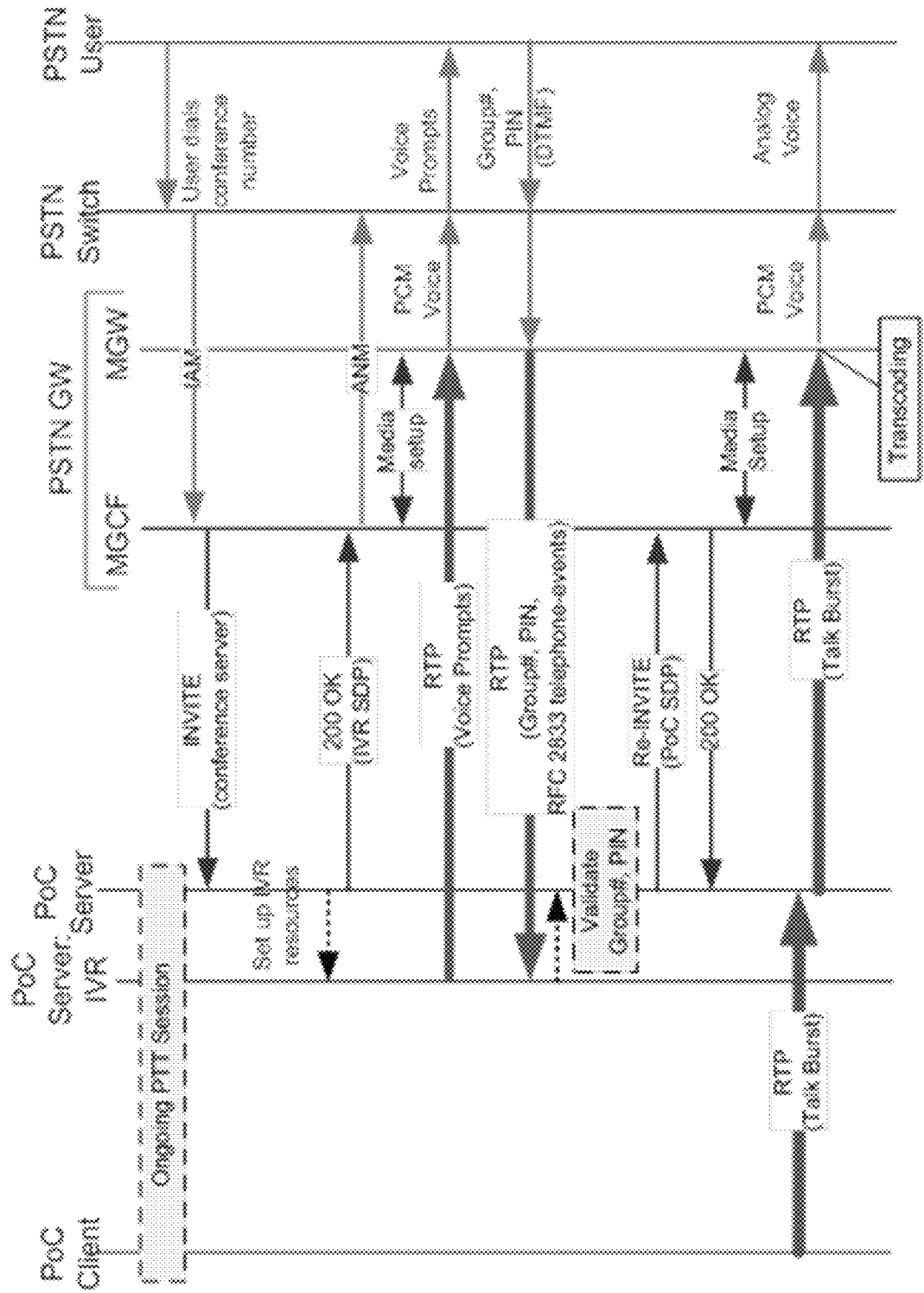
FIG. 9 illustrates a process for providing PoC session participation to a Public Switched Telephone Network (PSTN) host terminal via a Dial-In method, in accordance with an example embodiment.

FIG. 9 illustrates a process for providing PoC session participation to a Public Switched Telephone Network (PSTN) host terminal via a Dial-In method, in accordance with an example embodiment. The PSTN user/subscriber dials the conference phone number of the PoC server via the PSTN host terminal, which gets routed by the PSTN to the PSTN GW. The MGCF converts this incoming call to a SIP Invite to the PoC Server. The PoC Server identifies the invite as an incoming call from the PSTN, and sets up the Interactive Voice Response (IVR) resources needed to play voice prompts to the user through the PSTN host terminal. The PoC Server then responds to the SIP Invite a SIP OK message, providing the media address and parameters of the IVR function. The server then plays the initial announcements prompting the user to enter the conference code and PIN. The PSTN user hears the announcements, and, as prompted, enters the conference code and PIN via the host terminal. The DTMF digits dialed by the user via the PSTN host terminal are intercepted by the MGW and encoded as telephone-events in the RTP payload, which are forwarded to the PoC Server. The PoC Server receives and validates the conference code and PIN, and issues a SIP Re-Invite to modify the media parameters of the ongoing call to switch the media transport address and parameters from the IVR function to the normal PoC media stream. At this point, the PSTN host terminal is joined to the PoC session and begins to hear the PoC talk bursts trans-coded by the MGW.

Figure 10:
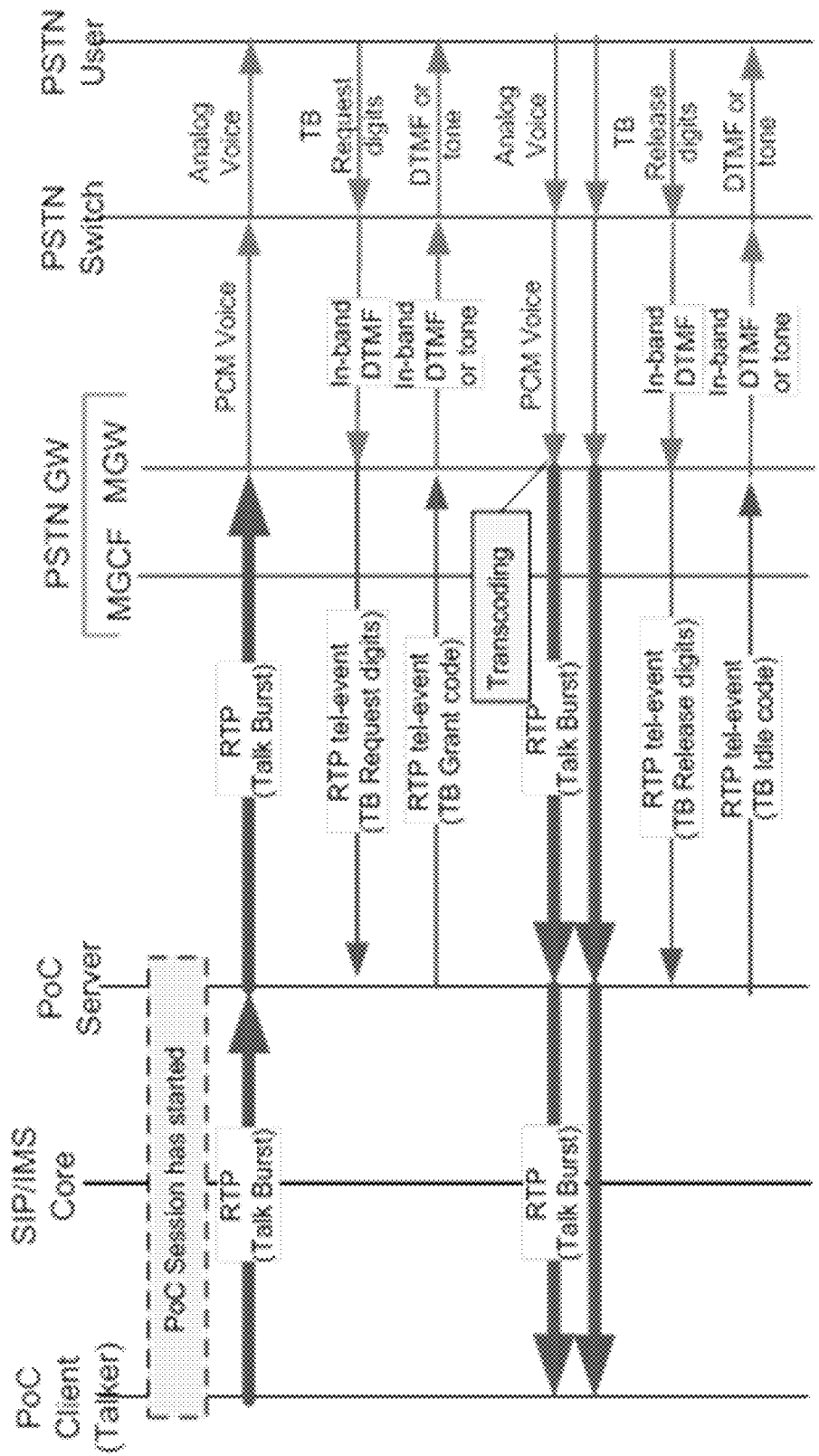
FIG. 10 illustrates a process for release of the talk floor of a PoC session, by a Public Switched Telephone Network (PSTN) host terminal, via DTMF-mapped Talk Burst Control signaling, in accordance with an example embodiment.

Once a PSTN host terminal is joined to a PoC session by either the "Dial-Out" or "Dial-In" processes, the user may request and release the talk floor by means of DTMF-mapped Talk Burst Control signaling. By way of example, with reference to FIG. 10, PoC floor control for a PSTN participant works as follows: TBCP responses and indications such as TB Grant, TB Revoke, TB Idle and TB Taken from the PoC Server are mapped to telephone-events or tones and encoded in RTP payload according to RFC 2833. The MGW converts these codes to the appropriate audible tones played towards the PSTN user. TBCP requests such as TB Request and TB Release from the PSTN participant are mapped to DTMF digit codes and are submitted to the PSTN GW as dialed DTMF digits. The MGW converts these to telephone-events in the RTP payload and sends them to the PoC Server. The mapping of TBCP request, responses and indications to DTMF digits telephone-event codes is configurable in the PoC server to accommodate local conditions such as nationally defined PSTN signaling tones and user preferences.

Although the present invention describes resource efficient multicast for satellite systems, the same concept can be applied to any wireless system, be it terrestrial or satellite. The described system architectures and methods are not limited to 3GPP systems, but rather can be applied to other systems, such as 3GPP2.

Figure 11:
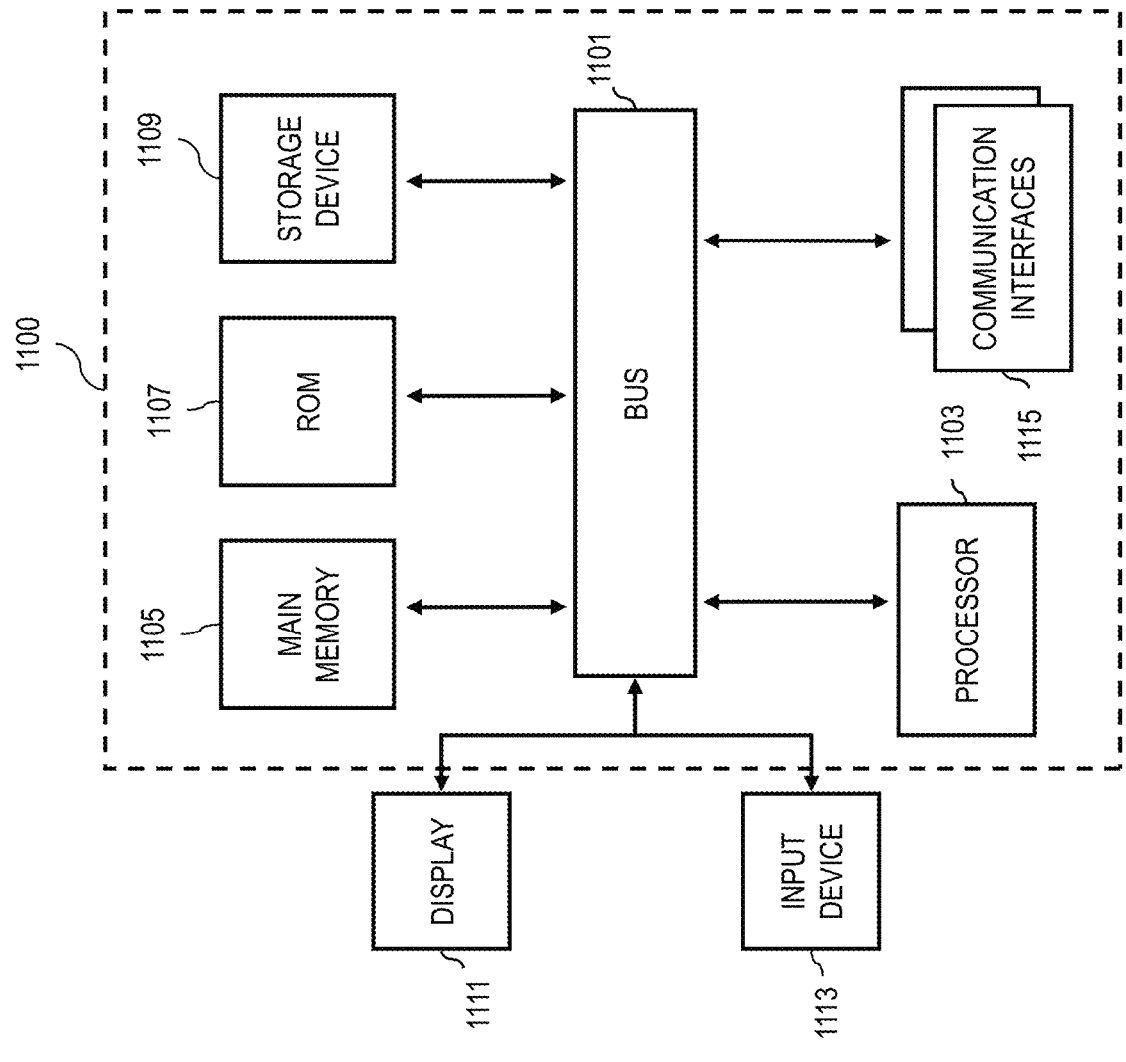
FIG. 11 illustrates a block diagram of hardware that can be used to implement certain example embodiments.

FIG. 11 illustrates a block diagram of example hardware that can be used to implement certain example embodiments. A computing system 1100 includes a bus 1101 or other communications mechanism for communicating information and a processor 1103 coupled to the bus 1101 for processing information. The computing system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computing system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computing system 1100 may be coupled via the bus 1101 to a display 1111, such as a liquid crystal display, or active matrix display, for displaying information to a user. An input device 1113, such as a keyboard including alphanumeric and other keys, may be coupled to the bus 1101 for communicating information and command selections to the processor 1103. The input device 1113 can include a cursor control, such as a mouse, a trackball, or cursor direction keys, for communicating direction information and command selections to the processor 1103 and for controlling cursor movement on the display 1111.

According to various embodiments of the invention, the processes described herein can be provided by the computing system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1100 also includes at least one communications interface 1115 coupled to bus 1101. The communications interface 1115 provides a two-way data communications coupling to a network link (not shown). The communications interface 1115 sends and receives electrical, electromagnetic, or optical signals that carry digital data streams representing various types of information. Further, the communications interface 1115 can include peripheral interface devices, such as a Universal Serial Bus (USB) interface, a PCMCIA (Personal Computer Memory Card International Association) interface, etc.

The processor 1103 may execute the transmitted code while being received and/or store the code in the storage device 1109, or other non-volatile storage for later execution. In this manner, the computing system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
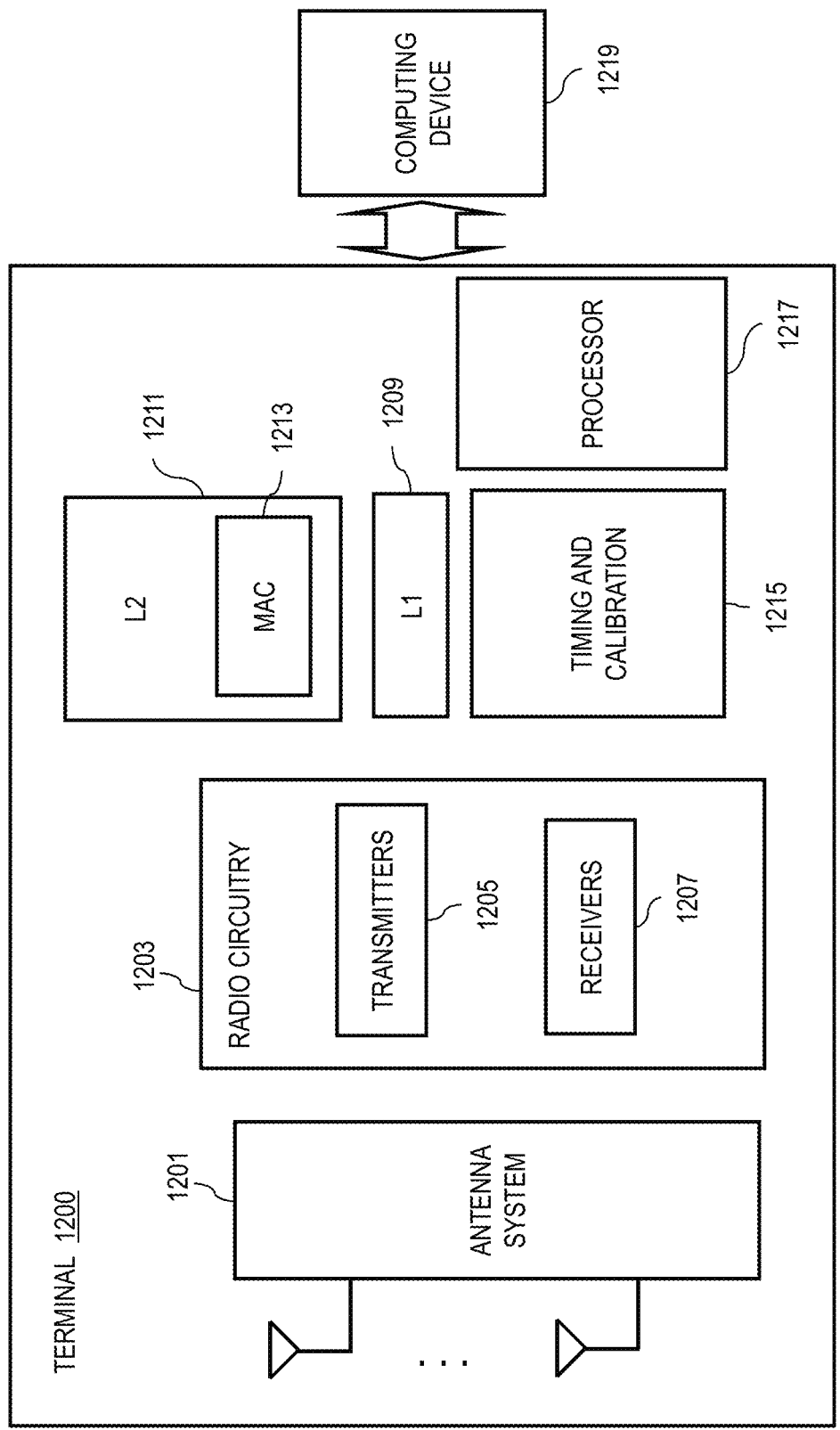
FIG. 12 illustrates a block diagram of example components of a user terminal configured to operate in the systems of FIGS. 1 and 2, according to an example embodiment.

FIG. 12 illustrates a block diagram of example components of a user terminal configured to operate in the systems of FIGS. 1 and 2, according to an example embodiment. A user terminal 1200 includes an antenna system 1201 (which can utilize multiple antennas) to receive and transmit signals. The antenna system 1201 is coupled to radio circuitry 1203, which includes multiple transmitters 1205 and receivers 1207. The radio circuitry encompasses all of the Radio Frequency (RF) circuitry as well as base-band processing circuitry. As shown, layer-1 (L1) and layer-2 (L2) processing are provided by units 1209 and 1211, respectively. Optionally, layer-3 functions can be provided (not shown). Module 1213 executes all Medium Access Control (MAC) layer functions. A timing and calibration module 1215 maintains proper timing by interfacing, for example, an external timing reference (not shown). Additionally, a processor 1217 is included. Under this scenario, the user terminal 1200 communicates with a computing device 1219, which can be a personal computer, work station, a Personal Digital Assistant (PDA), web appliance, cellular phone, etc.

Figure 13:
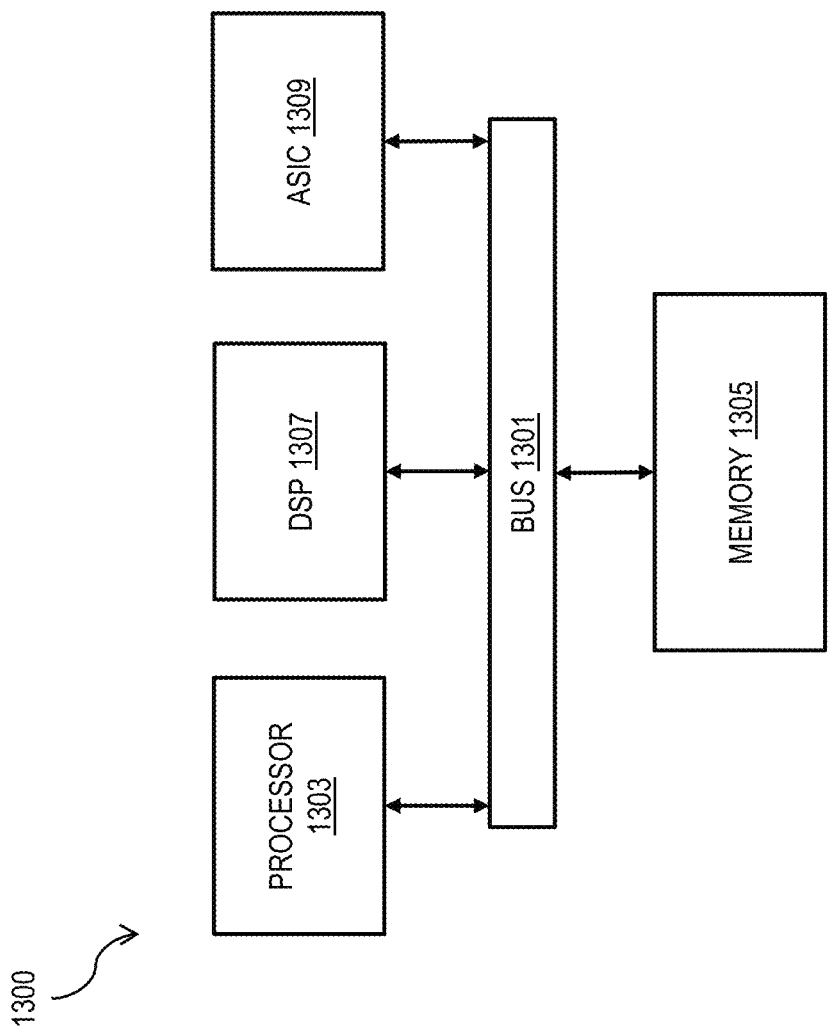
FIG. 13 illustrates a chip set 1300 in which embodiments of the invention may be implemented.

FIG. 13 illustrates a chip set 1300 in which embodiments of the invention may be implemented. Chip set 1300 includes, for instance, processor and memory components described with respect to FIG. 13 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 includes one or more processing cores with each core configured to perform independently. A multi-core processor enables multiprocessing within a single physical package. Examples of a multi-core processor include two, four, eight, or greater numbers of processing cores. Alternatively or in addition, the processor 1303 includes one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, and/or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM) and static memory (e.g., ROM) for storing executable instructions that, when executed by the processor 1303 and/or the DSP 1307 and/or the ASIC 1309, perform the process of example embodiments as described herein. The memory 1305 also stores the data associated with or generated by the execution of the process.

According to the preceding, various example embodiments have been described with reference to the accompanying drawings. The example embodiments, as described above, were chosen and described in order to best explain the principles of the invention and its practical application to thereby enable others skilled in the art to best utilize the invention in various embodiments and with various modifications as are suited to the particular use contemplated. The specification and drawings are accordingly to be regarded in an illustrative rather than restrictive sense. Moreover, it will be evident that various modifications and changes may be made thereto, and additional embodiments may be implemented, without departing from the broader scope of the invention.

What is claimed is:

1. A method comprising:
receiving, by a wireless terminal, a command for initiation of a new media transmission via a push-to-talk (PTT) session over a mobile communications network, wherein the PTT session comprises a previously established session;
generating, by the wireless terminal, a media access control layer (MAC layer) PTT request message, and transmitting the MAC layer PTT request message, via a wireless channel of the mobile communications network without requesting an uplink resource allocation for the MAC layer PTT request message, to a wireless gateway of the mobile communications network, wherein the MAC layer PTT request message is configured based on a MAC layer control messaging protocol that is applied for reduced resource requirements and reduced latency over the wireless channel;
generating, by the wireless gateway, a Talk Burst (TB) request message based on the MAC layer PTT request message and transmitting the TB request message to a remote PTT server; and
receiving, in response to the MAC layer PTT request message, a TB grant message from the wireless gateway indicating that floor control for the PTT session has been granted to the wireless terminal, wherein the TB grant message is received via a Talk Burst Control Protocol (TBCP) bearer and is based on a TB grant message from the remote PTT server.

2. The method of claim 1, wherein the MAC layer PTT request message includes terminal identification information and radio bearer flow identification information.

3. The method of claim 1, further comprising:
receiving, by the wireless terminal, in connection with the TB grant message, a MAC layer resource allocation message from the wireless gateway assigning guaranteed uplink bandwidth over the wireless channel for the new media transmission, wherein the MAC layer resource allocation message is a MAC layer control message.

4. The method of claim 3, further comprising:
receiving, by the wireless terminal, a command for termination of the new media transmission;
generating, by the wireless terminal, a MAC layer PTT release message, and transmitting the MAC layer PTT release message, via the wireless channel, to the wireless gateway, wherein the MAC layer PTT release message is configured based on the MAC layer control messaging protocol; and
receiving, from the wireless gateway and in response to the MAC layer PTT release message, a MAC layer resource release message indicating that the assigned guaranteed uplink bandwidth has been revoked and a TB revoke message indicating that the floor control for the PTT session has been revoked, wherein the TB revoke message is based on a TB idle message from the remote PTT server.

5. The method of claim 1, further comprising, prior to the receipt by the wireless terminal of the command for initiation of the new media transmission via the PTT session:
receiving, by the wireless terminal, a command for initiation of the PTT session, including a PTT session identifier;
generating a radio access bearer (RAB) binding create message, including the PTT session identifier and RAB binding information for associating the PTT session with respective radio access bearers (RABs), and transmitting the RAB binding create message, via the wireless channel, to the wireless gateway;
receiving, in response to the RAB binding create message, a RAB binding response message from the wireless gateway; and
performing a protocol signaling process, via the wireless gateway, to establish one or more packet data protocol (PDP) bearers via a core network of the mobile communications network, and to establish the PTT session via the remote PTT server.

6. The method of claim 5, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

7. The method of claim 1, further comprising, prior to the receipt by the wireless terminal of the command for initiation of the new media transmission via the PTT session:
receiving, by the wireless terminal, a session invite message from a remote PTT server for the PTT session, including a PTT session identifier;
generating a radio access bearer (RAB) binding create message, including the PTT session identifier and RAB binding information for associating the PTT session with respective radio access bearers (RABs), and transmitting the RAB binding create message, via the wireless channel, to the wireless gateway;
receiving, in response to the RAB binding create message, a RAB binding response message from the wireless gateway; and
performing a protocol signaling process, via the wireless gateway, to establish one or more packet data protocol (PDP) bearers via a core network of the mobile communications network, and to establish the PTT session via the remote PTT server.

8. The method of claim 7, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

9. The method of claim 1, further comprising, prior to the receipt by the wireless terminal of the command for initiation of the new media transmission via the PTT session:
receiving, by the wireless terminal, a command associated with a PTT function;
generating a radio access bearer (RAB) binding create message, including RAB binding information for associating the PTT session with respective radio access bearers (RABs), and transmitting the RAB binding create message, via the wireless channel, to the wireless gateway;
receiving, in response to the RAB binding create message, a first RAB binding response message from the wireless gateway;

performing a protocol signaling process, via the wireless gateway, to establish one or more packet data protocol (PDP) bearers via a core network of the mobile communications network, and to establish the PTT session via the remote PTT server, wherein the PTT session is initially inactive;

receiving, by the wireless terminal, a command for activation of the PTT session;

generating a first RAB binding update message, including a PTT session identifier corresponding to the PTT session, and transmitting the first RAB binding update message, via the wireless channel, to the wireless gateway;

receiving, in response to the first RAB binding update message, a second RAB binding response message from the wireless gateway; and performing a protocol signaling process, via the remote PTT server, to associate the PTT session with the PTT session identifier and to activate the PTT session.

10. The method of claim 9, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

11. The method of claim 9, further comprising:
receiving, by the wireless terminal, in further response to the first RAB binding update message, a MAC layer downlink channel resource allocation message assigning guaranteed downlink bandwidth over the wireless channel for receipt of PTT session media data.

12. The method of claim 11, further comprising:
receiving, by the wireless terminal, a command for deactivation of the PTT session;
generating a second RAB binding update message including an indicator for the deactivation of the PTT session, and transmitting the second RAB binding update message, via the wireless channel, to the wireless gateway;
receiving, in response to the second RAB binding update message, a third RAB binding response message and a downlink bandwidth release message indicating that the assigned guaranteed downlink bandwidth has been revoked; and
performing a protocol signaling process, via the remote PTT server, to release the PTT session.

13. The method of claim 1, further comprising, prior to the receipt by the wireless terminal of the command for initiation of the new media transmission via the PTT session:
receiving, by the wireless terminal, a command associated with a PTT function;
generating a radio access bearer (RAB) binding create message, including RAB binding information for associating the PTT session with respective radio access bearers (RABs), and transmitting the RAB binding create message, via the wireless channel, to the wireless gateway;
receiving, in response to the RAB binding create message, a first RAB binding response message from the wireless gateway;
performing a protocol signaling process, via the wireless gateway, to establish one or more packet data protocol (PDP) bearers via a core network of the mobile communications network, and to establish the PTT session via the remote PTT server, wherein the PTT session is initially inactive;

receiving, by the wireless terminal, a TB connect message from the wireless gateway, including a PTT session identifier corresponding to the PTT session, wherein the TB connect message is based on a talk burst connect message from the remote PTT server;

generating a first RAB binding update message, including the PTT session identifier, and transmitting the first RAB binding update message, via the wireless channel, to the wireless gateway; and receiving, in response to the first RAB binding update message, a second RAB binding response message from the wireless gateway.

14. The method of claim 13, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

15. The method of claim 13, further comprising:
receiving, by the wireless terminal, in connection with the TB connect message, a MAC layer resource allocation message, wherein the MAC layer resource allocation message assigns guaranteed downlink bandwidth over the wireless channel for receipt of PTT session media data.

16. The method of claim 15, further comprising:
receiving, by the wireless terminal, a TB disconnect message from the wireless gateway for deactivation of the PTT session, wherein the TB disconnect message is based on a TB disconnect message from the PTT server;
receiving, in connection with the TB disconnect message, a downlink bandwidth release message from the wireless gateway indicating that the assigned guaranteed downlink bandwidth has been revoked;
generating a second RAB binding update message including an indicator for the deactivation of the PTT session, and transmitting the second RAB binding update message, via the wireless channel, to the wireless gateway; and
receiving, in response to the second RAB binding update message, a third RAB binding response message from the wireless gateway.

17. A system comprising:
a wireless terminal; and
a wireless gateway, and
wherein the wireless terminal is configured (1) to receive a command for initiation of a new media transmission via a push-to-talk (PTT) session over a mobile communications network, wherein the PTT session comprises a previously established session, (2) to generate a media access control layer (MAC layer) PTT request message, and (3) to transmit the MAC layer PTT request message, via a wireless channel of the mobile communications network to the wireless gateway without requesting an uplink resource allocation for the MAC layer PTT request message, wherein the MAC layer PTT request message is configured based on a MAC layer control messaging protocol that is applied for reduced resource requirements and reduced latency over the wireless channel, wherein the wireless gateway is configured to generate a Talk Burst (TB) request message based on the MAC layer PTT request message, and to transmit the TB request message to a remote PTT server, and wherein the wireless terminal is further configured to receive, in response to the MAC layer PTT request message, a TB grant message from the wireless gateway indicating that floor control for the PTT session has been granted to the wireless terminal, wherein the TB grant message from the wireless gateway is received via a Talk Burst Control Protocol (TBCP) bearer and is based on a TB grant message from the remote PTT server.

18. The system of claim 17, wherein the MAC layer PTT request message includes terminal identification information and radio bearer flow identification information.

19. The system of claim 17, wherein the wireless terminal is further configured to receive, in connection with the TB grant message, a MAC layer resource allocation message from the wireless gateway assigning guaranteed uplink bandwidth over the wireless channel for the new media transmission, wherein the MAC layer resource allocation message is a MAC layer control message.

20. The system of claim 19, wherein the wireless terminal is further configured to:
receive a command for termination of the new media transmission;
generate a MAC layer PTT release message, and transmit the MAC layer PTT release message, via the wireless channel, to the wireless gateway, wherein the MAC layer PTT release message is configured based on the MAC layer control messaging protocol; and
receive, from the wireless gateway and in response to the MAC layer PTT release message, a MAC layer resource release message indicating that the assigned guaranteed uplink bandwidth has been revoked and a TB revoke message indicating that the floor control for the PTT session has been revoked, wherein the TB revoke message is based on a TB idle message from the remote PTT server.

21. The system of claim 17, wherein, prior to the receipt by the wireless terminal of the command for initiation of the new media transmission via the PTT session, the wireless terminal is configured to:
receive a command for initiation of the PTT session, including a PTT session identifier;
generate a radio access bearer (RAB) binding create message, including the PTT session identifier and RAB binding information for associating the PTT session with respective radio access bearers (RABs), and transmit the RAB binding create message, via the wireless channel, to the wireless gateway;
receive, in response to the RAB binding create message, a RAB binding response message from the wireless gateway; and
perform a protocol signaling process, via the wireless gateway, to establish one or more packet data protocol (PDP) bearers via a core network of the mobile communications network, and to establish the PTT session via the remote PTT server.

22. The system of claim 21, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

23. The system of claim 17, wherein, prior to the receipt by the wireless terminal of the command for initiation of the new media transmission via the PTT session, the wireless terminal is configured to:
receive a session invite message from a remote PTT server for the PTT session, including a PTT session identifier;
generate a radio access bearer (RAB) binding create message, including the PTT session identifier and RAB binding information for associating the PTT session with respective radio access bearers (RABs), and transmit the RAB binding create message, via the wireless channel, to the wireless gateway;
receive, in response to the RAB binding create message, a RAB binding response message from the wireless gateway; and
perform a protocol signaling process, via the wireless gateway, to establish one or more packet data protocol (PDP) bearers via a core network of the mobile communications network, and to establish the PTT session via the remote PTT server.

24. The system of claim 23, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

25. The system of claim 17, wherein, prior to the receipt by the wireless terminal of the command for initiation of the new media transmission via the PTT session, the wireless terminal is configured to:
receive a command associated with a PTT function;
generate a radio access bearer (RAB) binding create message, including RAB binding information for associating the PTT session with respective radio access bearers (RABs), and transmit the RAB binding create message, via the wireless channel, to the wireless gateway;
receive, in response to the RAB binding create message, a first RAB binding response message from the wireless gateway;
perform a protocol signaling process, via the wireless gateway, to establish one or more packet data protocol (PDP) bearers via a core network of the mobile communications network, and to establish the PTT session via the remote PTT server, wherein the PTT session is initially inactive;
receive a command for activation of the PTT session;
generate a first RAB binding update message, including a PTT session identifier corresponding to the PTT session, and transmit the first RAB binding update message, via the wireless channel, to the wireless gateway;
receive, in response to the first RAB binding update message, a second RAB binding response message from the wireless gateway; and
perform a protocol signaling process, via the remote PTT server, to associate the PTT session with the PTT session identifier and to activate the PTT session.

26. The system of claim 25, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

27. The system of claim 25, wherein the wireless terminal is further configured to receive, in further response to the first RAB binding update message, a MAC layer downlink channel resource allocation message assigning guaranteed downlink bandwidth over the wireless channel for receipt of PTT session media data.

28. The system of claim 27, wherein the wireless terminal is further configured to:
receive a command for deactivation of the PTT session;
generate a second RAB binding update message including an indicator for the deactivation of the PTT session, and transmit the second RAB binding update message, via the wireless channel, to the wireless gateway;
receive, in response to the second RAB binding update message, a third RAB binding response message and a downlink bandwidth release message indicating that the assigned guaranteed downlink bandwidth has been revoked; and
perform a protocol signaling process, via the remote PTT server, to release the PTT session.

29. The system of claim 17, wherein, prior to the receipt by the wireless terminal of the command for initiation of the new media transmission via the PTT session, the wireless terminal is configured to:
receive a command associated with a PTT function;
generate a radio access bearer (RAB) binding create message, including RAB binding information for associating the PTT session with respective radio access bearers (RABs), and transmit the RAB binding create message, via the wireless channel, to the wireless gateway;
receive, in response to the RAB binding create message, a first RAB binding response message from the wireless gateway;
perform a protocol signaling process, via the wireless gateway, to establish one or more packet data protocol (PDP) bearers via a core network of the mobile communications network, and to establish the PTT session via the remote PTT server, wherein the PTT session is initially inactive;
receive a TB connect message from the wireless gateway, including a PTT session identifier corresponding to the PTT session, wherein the TB connect message from the wireless gateway is based on a TB connect message from the remote PTT;
generate a first RAB binding update message, including the PTT session identifier, and transmit the first RAB binding update message, via the wireless channel, to the wireless gateway; and
receive, in response to the first RAB binding update message, a second RAB binding response message from the wireless gateway.

30. The system of claim 29, wherein the RAB binding information comprises one or more of RAB identifiers, application type identifiers identifying one or more application types that will utilize the associated RABs, and application-specific information, wherein the application-specific information includes one or more of PTT session signaling mode information, PTT channel information, PTT group information and PTT session information.

31. The system of claim 29, further comprising:
receiving, by the wireless terminal, in connection with the TB connect message, a MAC layer resource allocation message, wherein the MAC layer resource allocation message assigns guaranteed downlink bandwidth over the wireless channel for receipt of PTT session media data.

32. The system of claim 31, wherein the wireless terminal is further configured to:
receive a TB disconnect message from the wireless gateway for deactivation of the PTT session, wherein the TB disconnect message from the wireless gateway is based on a TB disconnect from the PTT server;
receive, in connection with the TB disconnect message, a downlink bandwidth release message from the wireless gateway indicating that the assigned guaranteed downlink bandwidth has been revoked;
generate a second RAB binding update message including an indicator for the deactivation of the PTT session, and transmit the second RAB binding update message, via the wireless channel, to the wireless gateway; and
receive, in response to the second RAB binding update message, a third RAB binding response message from the wireless gateway.

\* \* \* \* \*